June 29, 1965 O. L. MacSORLEY 3,192,363

BINARY MULTIPLIER FOR SKIPPING A STRING OF ZEROS OR ONES

Filed May 24, 1961 24 Sheets-Sheet 1

INVENTOR

OLIN L. MAC SORLEY

BY *Thomas & Crickenberger*

ATTORNEYS

FIG. 2

*LATCH REGISTER NUMBER

MULTIPLICAND (*172, 173 – – – 179, 180 – – – 186, 187)

| | 1 2 | 3 4 5 6 | 7 8 9 10 | 11 12 13 14 | 15 16 17 18 |
|---|---|---|---|---|---|
| T | 0 0 | 1 1 1 1 | 0 0 1 1 | 1 0 1 0 | 0 1 1 0 |
| C | 1 1 | 0 0 0 0 | 1 1 0 0 | 0 1 0 1 | 1 0 1 0 |

| SHIFT COUNTER | (*804 803 802 801 800) | LATCH CONTROL | | 1 2 (*290 291) | 3 4 5 6 | 7 8 9 10 (298 299) | 11 12 13 14 | 15 16 17 18 (306 307) | MULTIPLIER 19 20 21 22 (308 309) | 23 24 25 26 (315) | 27 28 29 30 (316 – 319) | SHIFT DECODER 31 32 33 34 (320 – 323) | 35 36 (324 325) | 37 | T/C | SHIFT | |
|---|---|---|---|---|---|---|---|---|---|---|---|---|---|---|---|---|---|
| 18 | 1 0 0 1 0 | 1 | 1 | 0 0 | 0 0 0 0 | 0 0 0 0 | 0 0 0 0 | 0 0 0 0 | 1 1 1 0 | 0 0 1 0 | 1 1 0 0 | 1 0 1 0 | 0 0 | | | | |
| -3 | 1 1 1 0 1 | | 2 | 0 0 | 0 0 0 0 | 0 0 0 0 | 0 0 0 0 | 0 0 0 0 | x1 1 1 0 | 0 0 1 0 | 1 1 0 0 | 1 0 1 0 | 0 0 | 0 | T | 0 | DON'T ADD |
| | | | 3 | 0 0 | 0 0 0 0 | 0 0 0 0 | 0 0 0 0 | 0 0 0 0 | | | | | | | | | |
| | | | 4 | 0 0 | 0 0 0 0 | 0 0 0 0 | 0 0 0 0 | 0 0 0 0 | | | | | | | | | |
| 15 | 0 1 1 1 1 | 2 | 5 | 0 0 | 0 0 0 0 | 0 0 0 0 | 0 0 0 0 | 0 0 0 0 | x1 1 1 0 | 0 0 1 0 | 1 1 0 0 | 1 0 1 0 | 0 0 | | | | |
| -2 | 1 1 1 1 0 | | 6 | 0 0 | 0 0 0 0 | 0 0 0 0 | 0 0 0 0 | 0 0 0 0 | 0x0 0x1 | 1 1 0 0 | 0 1 0 1 | 1 0 0 1 | 0 1 | 0 | T | 3 | ADD |
| | | | 7 | 0 0 | 1 1 1 1 | 0 0 1 1 | 1 0 1 0 | 0 1 1 0 | | | | | | | | | |
| | | | 8 | 0 0 | 1 1 1 1 | 0 0 1 1 | 1 0 1 0 | 0 1 1 0 | | | | | | | | | |
| 13 | 0 1 1 0 1 | 3 | 9 | 0 0 | 1 1 1 1 | 0 0 1 1 | 1 0 1 0 | 0 1 1 0 | 0x0 0x1 | 1 1 0 0 | 0 1 0 1 | 1 0 0 1 | 0 1 | | | | |
| -3 | 1 1 1 0 1 | | 10 | 0 0 | 0 0 1 1 | 1 1 0 0 | 1 1 1 0 | 1 0 0 1 | 1 0 0x0 | 0x1 1 1 | 0 0 0 1 | 0 1 1 0 | 0 1 | 0 | T | 2 | ADD |
| | | | 11 | 0 0 | 1 1 1 1 | 0 0 1 1 | 1 0 1 0 | 0 1 1 0 | | | | | | | | | |
| | | | 12 | 0 1 | 0 0 1 1 | 0 0 0 0 | 1 0 0 0 | 1 1 1 1 | | | | | | | | | |
| 10 | 0 1 0 1 0 | 4 | 13 | 0 1 | 0 0 1 1 | 0 0 0 0 | 1 0 0 0 | 1 1 1 1 | 1 0 0x0 | 0x1 1 1 | 0 0 0 1 | 0 1 1 0 | 0 1 | | | | |
| -2 | 1 1 1 1 0 | | 14 | 0 0 | 0 0 1 0 | 0 1 1 0 | 0 0 0 1 | 0 0 0 1 | 1 1 1 1 | 0 0x0 0 | x1 1 1 0 | 0 0 1 0 | 1 1 | 0 | C | 3 | ADD |
| | | | 15 | 1 1 | 0 0 0 0 | 1 1 0 0 | 0 1 0 1 | 1 0 1 0 | | | | | | | | | |

| | | | | | | | | | | | | | | | | | |
|---|---|---|---|---|---|---|---|---|---|---|---|---|---|---|---|---|---|
| | | | 16 | 1 1 | 0 0 1 1 | 0 0 1 0 | 0 1 1 0 | 1 0 1 1 | | | | | | | | | |
| 8 | 0 1 0 0 0 | 5 | 17 | 1 1 | 0 0 1 1 | 0 0 1 0 | 0 1 1 0 | 1 0 1 1 | 1 1 1 1 | 0 0×0 0 | ×1 1 1 0 | 0 0 1 0 | 1 1 | | | | |
| -2 | 1 1 1 1 0 | | 18 | 1 1 | 1 1 0 0 | 1 1 0 0 | 1 0 0 1 | 1 0 1 0 | 1 1 1 1 | 1 1 0 0 | ×0 0×1 1 | 1 0 0 0 | 1 0 | 1 | C | 2 | ADD |
| | | | 19 | 1 1 | 0 0 0 0 | 1 1 0 0 | 0 1 0 1 | 1 0 1 0 | | | | | | | | | |
| | | | 20 | 1 0 | 1 1 0 1 | 1 0 0 0 | 1 1 1 1 | 0 1 0 0 | | | | | | | | | |
| 6 | 0 0 1 1 0 | 6 | 21 | 1 0 | 1 1 0 1 | 1 0 0 0 | 1 1 1 1 | 0 1 0 0 | 1 1 1 1 | 1 1 0 0 | ×0 0×1 1 | 1 0 0 0 | 1 0 | | | | |
| -3 | 1 1 1 0 1 | | 22 | 1 1 | 1 0 1 1 | 0 1 1 0 | 0 0 1 1 | 1 1 0 1 | 0 0 1 1 | 1 1 1 1 | 0 0×0 0 | ×1 1 1 0 | 0 0 | 1 | T | 2 | ADD |
| | | | 23 | 0 0 | 1 1 1 1 | 0 0 1 1 | 1 0 1 0 | 0 1 1 0 | | | | | | | | | |
| | | | 24 | 0 0 | 1 0 1 0 | 1 0 0 1 | 1 1 1 0 | 0 0 1 1 | | | | | | | | | |
| 3 | 0 0 0 1 1 | 7 | 25 | 0 0 | 1 0 1 0 | 1 0 0 1 | 1 1 1 0 | 0 0 1 1 | 0 0 1 1 | 1 1 1 1 | 0 0×0 0 | ×1 1 1 0 | 0 0 | | | | |
| -3 | 1 1 1 0 1 | | 26 | 0 0 | 0 0 0 1 | 0 1 0 1 | 0 0 1 1 | 1 1 0 0 | 0 1 1 0 | 0 1 1 1 | 1 1 1 0 | 0×0 0×1 | 1 1 | 0 | C | 3 | ADD |
| | | | 27 | 1 1 | 0 0 0 0 | 1 1 0 0 | 0 1 0 1 | 1 0 1 0 | | | | | | | | | |
| | | | 28 | 1 1 | 0 0 1 0 | 0 0 0 1 | 1 0 0 1 | 0 1 1 0 | | | | | | | | | |
| 0 | 0 0 0 0 0 | 8 | 29 | 1 1 | 0 0 1 0 | 0 0 0 1 | 1 0 0 1 | 0 1 1 0 | 0 1 1 0 | 0 1 1 1 | 1 1 1 0 | 0×0 0×1 | 1 1 | | | | |
| | | | 30 | 1 1 | 1 1 1 0 | 0 1 0 0 | 0 0 1 1 | 0 0 1 0 | 1 1 0 0 | 1 1 0 0 | 1 1 1 1 | 1 1 0 0 | ×0 0× | 1 | T | 3 | ADD |
| | | | 31 | 0 0 | 1 1 1 1 | 0 0 1 1 | 1 0 1 0 | 0 1 1 0 | | | | | | | | | |
| | | | 32 | 0 0 | 1 1 0 1 | 0 1 1 1 | 1 1 0 1 | 1 0 0 0 | | | | | | | | | |
| | | 9 | 33 | 0 0 | 1 1 0 1 | 0 1 1 1 | 1 1 0 1 | 1 0 0 0 | 1 1 0 0 | 1 1 0 0 | 1 1 1 1 | 1 1 0 0 | ×0 0× | | | | STOP |

PRODUCT

FIG. 3

June 29, 1965 O. L. MacSORLEY 3,192,363

BINARY MULTIPLIER FOR SKIPPING A STRING OF ZEROS OR ONES

Filed May 24, 1961 24 Sheets-Sheet 8

June 29, 1965 O. L. MacSORLEY 3,192,363

BINARY MULTIPLIER FOR SKIPPING A STRING OF ZEROS OR ONES

Filed May 24, 1961 24 Sheets-Sheet 13

June 29, 1965 O. L. MacSORLEY 3,192,363

BINARY MULTIPLIER FOR SKIPPING A STRING OF ZEROS OR ONES

Filed May 24, 1961 24 Sheets-Sheet 14

June 29, 1965 O. L. MacSORLEY 3,192,363

BINARY MULTIPLIER FOR SKIPPING A STRING OF ZEROS OR ONES

Filed May 24, 1961 24 Sheets-Sheet 24

United States Patent Office 3,192,363

Patented June 29, 1965

3,192,363

BINARY MULTIPLIER FOR SKIPPING A STRING OF ZEROES OR ONES

Olin L. MacSorley, Wappingers Falls, N.Y., assignor to International Business Machines Corporation, New York, N.Y., a corporation of New York Filed May 24, 1961, Ser. No. 112,455
3 Claims. (Cl. 235—164)

The present invention relates to data processing systems and more particularly to an arithmetic device for performing multiplication operations.

The speed at which calculations may be performed in many computing devices is a prime consideration. In order to reduce the time required to perform the calculations it is customary to employ parallel arithmetic devices in which calculations are performed on all orders or digits simultaneously. It is important to reduce the time for performing multiplication operations in parallel arithmetic devices still further, and it is this aspect of computing devices to which this invention is directed.

It has been customary in many earlier computing devices to multiply by generating and accumulating one partial product for each bit or order of the multiplier, thereby involving a shift operation or an add operation plus a shift operation for each bit of the multiplier. For the purpose of minimizing the time required to perform multiplication there is provided according to this invention a multiplier arrangement which reduces the total number of addition operations.

According to one aspect of the present invention, an improved multiplier is provided which generates partial products for two or more bits of the multiplier simultaneously instead of generating a partial product for each bit of the multiplier.

According to the present invention an arithmetic device is provided for multiplying a multiplicand by a multiplier to produce a product, and which includes an arrangement for detecting the distribution of bits in the multiplier. This arrangement operates a variable length shifter for shifting across groups of bits in the multiplier. Additions are performed between the multiplicand and a partial product to produce the final product. Since the shifts made depend on bit distribution, a number of bits may be shifted across for each add cycle. Hence, an addition is not made for each bit but for groups of bits, and the speed of the operation of the present arithmetical device is increased.

In an illustrative embodiment according to the present invention, a multiplier is stored in a register in which the product also is stored as it is generated, and the multiplier and the partial product are shifted by the same amount and at the same time. The total number of positions to be shifted is stored, and this number is dependent upon the length of the multiplier. A multiplicand is entered into a register, and the true or complemental form of the multiplicand is successively added with the partial product. After each add cycle a shift is made, and this shift may vary in length. A shift decoder senses the output of the multiplier register after it is shifted to indicate the next shift to be made. Additional circuit also sense the output of the multiplier register after it is shifted to indicate whether to add or not and whether to utilize the multiplicand in the true or complement form. After the predetermined number of positions have been shifted, the multiplication is complete, and the product is stored in the multiplier register.

The foregoing and other objects, features and advantages of the invention will be apparent from the following more particular description of a preferred embodiment of the invention, as illustrated in the accompanying drawings:

FIG. 1 illustrates in block schematic form a multiplier constructed in accordance with the principles of this invention;

FIGS. 2 and 3, when mechanically arranged as illustrated in FIG. 4*a*, show a table which illustrates a multiplication operation performed by the multiplier illustrated in FIG. 1;

FIGS. 5 through 22, when arranged as shown in FIG. 4*b*, illustrate in detail the multiplier shown in block schematic form in FIG. 1;

FIG. 23*a* is a block diagram of an individual latch register employed throughout the FIGS. 5 through 22;

FIG. 23*b* is a logical block diagram of the latch register in FIG. 23*a*;

Figure 1:
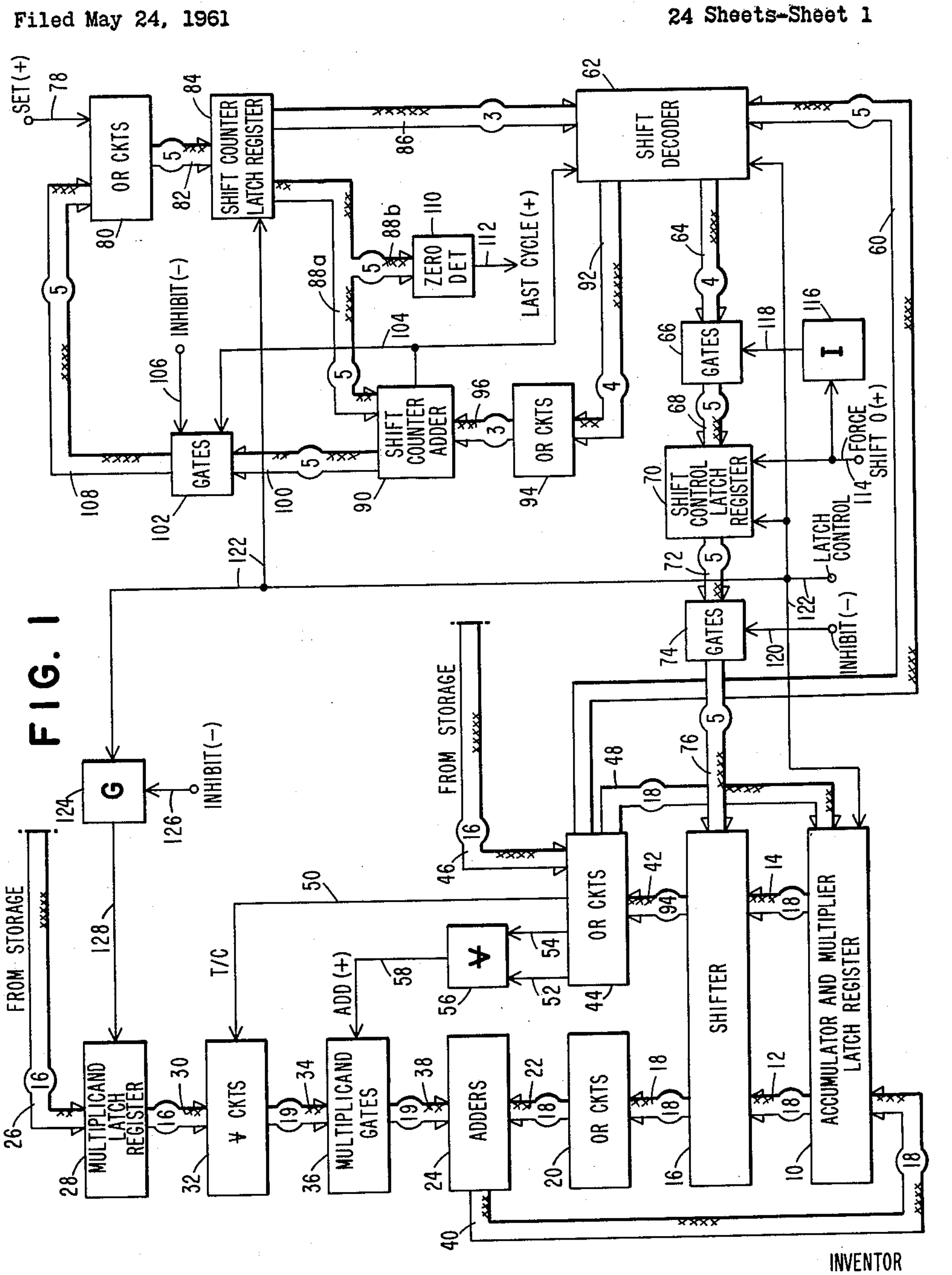

In the following discussion of the illustrated multiplier of the present invention, D.C. rather than pulse type logic is employed. The term addition is used to include both addition and subtraction, and the same adder, or adders, are utilized for both. Subtraction is performed by the use of the two's complement of the number to be subtracted from the other. The two's complement is obtained by inverting all bits in the number and also forcing an additional one into the carry position of the low order bit position of the adder when performing the addition.

Cables are used throughout the drawings to transfer data, and they are illustrated as two parallel lines with arrowheads at one end thereof and at some point intermediate the ends of the cables, the two parallel lines are widened in the form of a circle and numbers appear within the circle. The numbers appearing within the circle indicate the number of conductors within the cable. The input and the output lines of the block symbols are connected to the most convenient side of the block including the same side in some cases. An input line to a corner of a block symbol and an output line from the adjacent corner of that block symbol indicate that the signals are applied to the input of the circuit represented by the block and the input conductor is electrically connected to the output conductor of the adjacent corner. The bold face character symbols appearing within a block symbol identify a common name for the circuit represented, that is, G identifies a gate circuit, O a logical OR circuit, A a logical AND circuit, and so forth.

In the description of the multiplier of the present invention a general discussion of the theory of operation is set forth, followed by an illustrative arrangement of a multiplier utilizing these principles. The general arrangement of the illustrative multiplier is first described in connection with an overall block system diagram with respect both to the manner in which the various circuit components and apparatus are interconnected and with respect to the general overall operation which is performed by these components and apparatus. This general description is followed by a separate and detailed description of the overall system, along with a description of the various components and apparatus which so require it.

As noted previously, multiplication in a computer usually is performed by repetitive addition. The time required to perform a multiplication is proportional to the number of additions required assuming constant circuit and adder speeds. The slowest operation is by performing one add cycle for each bit of the multiplier. A reduction in time may be obtained by substituting shift cycles for add cycles when the multiplier bit is a zero.

This time may be reduced still further by providing the ability to shift across more than one position at a time when there are several zeros in a group. Assuming random distribution with equal numbers of ones and zeros in the multiplier, this operation should result in a fifty percent reduction in time, and this improvement should be obvious from normal methods of performing multiplication.

According to a feature of the present invention, further improvements may be secured by taking advantage of some of the properties of the binary system. A binary integer may be written in the following form:

$$A_n 2^n + A_{n-1} 2^{n-1} + A_{n-2} 2^{n-2} + \dots + A_2 2^2 + A_1 2^1 + A_0 2^0$$

The actual number, as written, consists of the characteristics only and would be written $A_nA_{n-1}A_{n-2} \dots A_2A_1A_0$, where each A would have a value of either one or zero. If such a number contains the coefficients $$\dots 011111111110 \dots$$

this part of the number would have the value $$2^{n-1} + 2^{n-2} + \dots + 2^{n-x}$$

where "$n$" is the position number of the highest order "one" in the group for which the lowest order position in the number is designated "zero," and $x$ is the number of successive "ones" in the group. The numerical value of this last expression also may be obtained from the expression $2^n - 2^{n-x}$, where $n$ and $x$ have the same values as before. For example, in the binary number 0111100, $n$ is 6 and $x$ is 4. The decimal equivalent of the number is given by $2^5+2^4+2^3+2^2=32+16+8+4=60$. It is also given by $2^6-2^2=64-4=60$. Thus, for any string of "ones" in a multiplier, the necessity for one addition for each bit may be replaced by one addition and one subtraction for each group.

To illustrate the above, a typical multiplier is shown below with the required operations indicated. Each group of "ones" is underlined.

$$\underline{1\,1\,1\,1}\,0\,0\,0\,0\,\underline{1\,1\,1}\,0\,\underline{1\,1\,1}\,0\,\underline{1}\,0\,\underline{1}\,0\,0\,0\,\underline{1}\,0\,\underline{1}$$

```
+    −    +   −+   −+−+−   +−+−
```

Additional improvement may be obtained by using the fact that $+2^n-2^{n-1}=+2^{n-1}$ and $-2^n+2^{n-1}=-2^{n-1}$. This is illustrated by applying it to the above example. The original results are given first, with the operations to be combined underlined. The first result is that obtained by starting at the high order end of the number, while the second is obtained by starting at the low order end.

```
1111000011101110101000101
 +    −    +   −+   −+−+−   +−+−
 +    −    +    −    − −−    + +
 +    −    +   −−   −+−+−   +−+−
 +    −    +    −   − + +    + +
```

For a given multiplier, the number of additions that will be required may be computed as follows. A group of "ones" is defined as a series, containing at least one pair of adjacent "ones" and no adjacent "zeros," and starting and ending with a "one." The number of add cycles is equal to the following: Two times the number of groups, plus the number of "zeros" contained within groups, plus the number of "ones" not contained within groups. This may be illustrated with the previous example.

$$\underline{1\,1\,1\,1}\,0\,0\,0\,0\,\underline{1\,1\,1\,0\,1\,1\,1\,0\,1\,0\,1}\,0\,0\,0\,1\,0\,1$$

There are two groups in the above number. The first group contains no "zeros," the second contains three. There are two "ones" not contained in any groups. This gives $(2\times2)+3+2=9$, which is the number of add cycles necessary.

The rules for performing a multiplication follow below.

It is assumed that the multiplier and the partial product always will be shifted the same amount and at the same time. The multiplier is shifted in relation to a decoder which determines the number of shifts to be made, and the partial product with relation to the multiplicand. Operation is assumed starting at the low order end of the multiplier, which means that shifting is to the right. If the lowest order bit of the multiplier is a "one," it is treated as though it had been approached by shifting across "zeros."

(1) When shifting across "zeros" (from the low order end of the multiplier), stop at the first "one":
  - (a) If this "one" is followed immediately by a "zero," add the multiplicand, then shift across all following "zeros";
  - (b) If this "one" is followed immediately by a second "one," subtract the multiplicand, then shift across all following "ones."

(2) When shifting across "ones" (from the low order end of the multiplier), stop at the first "zero":
  - (a) If this "zero" is followed immediately by a "one," subtract the multiplicand, then shift across all following "ones."
  - (b) If this "zero" is followed immediately by a second "zero" add the multiplicand, then shift across all following "zeros."

A shift counter is utilized to keep track of the number of shifts and recognize the completion of the multiplication.

If the high order bit of the multiplier is a "one" and is approached by shifting across "ones," that shift will be to the first "zero" beyond the end of the multiplier, and that "zero" along with the bit in the next higher order position of the register will be decoded to determine whether to add or subtract. For this reason, if the multiplier initially is located in the part of the register in which the product is to be developed, the multiplier should be so placed that there will be at least two blank positions between the locations of the low order bit of the partial product and the high order bit of the multiplier. Otherwise, the low order bit of the product will be decoded as part of the multiplier. Alternatively, or additionally, the shift counter may indicate the end of the multiplication (by indicating when all shifts have been made) to force the last operation to be an addition.

Whenever the shifting is across groups of ones the partial product will be in complement form. In this case "ones" must be inserted in all high order positions that would be left blank normally by shifting. In a similar manner "zeros" are inserted in all high order positions left blank by shifting when the partial product is in true form.

A system for performing multiplication in accordance with the principles of the present invention is shown in block form in FIG. 1. An accumulator and multiplier latch register 10 is connected through cables 12 and 14 to a shifter 16. The shifter 16 is connected through a cable 18 to OR circuits 20. The OR circuits 20 are connected through a cable 22 to adders 24.

The multiplicand latch register 28 is connected through a cable 30 to exclusive OR circuits 32. The exclusive OR circuits 32 are connected through a cable 34 to multiplicand gates 36. The outputs from the gates 36 are connected through a cable 38 to the adders 24. The outputs from the adders 24 are connected through a cable 40 to the accumulator and multiplier latch register 10.

The output of the shifter 16 is also connected through a cable 42 to OR circuits 44. A cable 46 is connected from a storage device (not shown) to the OR circuits 44. The cable 26 connected to the multiplicand latch register 28 supplies the multiplicand from storage, and the cable 46 connected to the OR circuits 44 supplies the multiplier from storage.

The outputs of certain of the OR circuits 44 are connected through a cable 48 to the accumulator and multiplier latch register 10. An output from one of the OR circuits 44 is connected through a line 50 to the exclusive OR circuits 32. The line 50 serves to provide a signal to select either the true or the complement of the multiplicand. Outputs from two of the OR circuits 44 are connected through lines 52 and 54 to an exclusive OR circuit 56. The output of the exclusive OR circuit 56 is connected through a line 58 to the multiplicand gates 36. The exclusive OR circuit 56 serves to supply a positive signal to the multiplicand gates 36 to condition these gates when an addition is to be performed, and a negative inhibit signal when no addition is to be performed.

A cable 60 is connected from the OR circuits 44 to a shift decoder 62. A cable 64 is connected from the shift decoder 62 to gates 66. The outputs of the gates 66 are connected through a cable 68 to a shift control latch register 70. The shift control latch register 70 is connected through a cable 72 to gates 74. The gates 74 are connected through a cable 76 to the shifter 16.

A set line 78 is connected to OR circuits 80. The OR circuits 80 are connected through a cable 82 to shift control latch register 84. The set line 78 and the OR circuits 80 serve to provide an initial shift count to the shift counter latch register 84. A cable 86 is connected from the shift counter latch register 84 to the shift decoder 62.

A cable **88*a* is connected from the shift counter latch register 84 to a shift counter adder 90. The shift decoder 62 is connected through a cable 92 to OR circuits 94. The OR circuits 94 are connected through a cable 96 to the shift counter adder 90. A cable 100 is connected from the shift counter adder 90 to gates 102. A line 104 is connected from the shift counter adder 90 to the shift decoder 62, and to the gates 102. An inhibit line 106 is connected to the gates 102. The gates 102 are connected through a cable 108 to the OR circuits 80. The shift counter latch register 84 is connected through a cable 88*b* to a zero detector 110. The zero detector 110 provides an output signal on a line 112** to a trigger (not shown) connected with associated equipment to indicate when the multiplication is complete.

A line 114 is connected to the shift control latch register 70 and to an inverter 116. The inverter 116 is connected through a line 118 to the gates 66. When a positive signal is applied to the line 114 a shift of zero is forced into the shift control latch register. An inhibit line 120 is connected to the gates 74. A latch control line 122 is connected through a gate 124 and a line 128 to the multiplicand latch register 28. The latch control line 122 is connected to the shift counter latch register 84, the shift control latch register 70, the shift decoder 62, and the accumulator and multiplier latch register 10. An inhibit line 126 is connected to the gate 124.

Figure 4A:
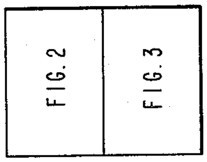

The operation of the multiplier illustrated in FIG. 1 will now be described in connection with the multiplication problem shown in FIGS. 2 and 3. FIGS. 2 and 3, when arranged as illustrated in FIG. 4*a*, show a table which sets forth the operations performed in an exemplary multiplication problem. The multiplicand is illustrated in its true and in its complement (two's complement) form at the top of FIG. 2. The multiplier is illustrated at row 1, lines 19 through 34 in FIG. 2. The final product is illustrated in row 33, columns 3 through 34 in FIG. 3. Rows 1, 5, 9, 13, 17, 21, 25, 29 and 33 illustrate the contents of the accumulator and multiplier latch register 10. Rows 2, 6, 10, 14, 18, 22, 26 and 30 illustrate the data present at the output of the shifter 16. The column numbers appearing at the top of FIG. 2 correspond to the latch registers within the accumulator and multiplier latch register 10. The information appearing in the right most unnumbered columns in FIGS. 2 and 3 indicate whether the true or the complement form of the multiplicand is utilized, how many shifts are being made, and whether an addition is performed. The data appearing in the leftmost unnumbered columns in FIGS. 2 and 3 indicates the contents of the shift counter latch register.

In loading the multiplier and the multiplicand from storage it is assumed that gates (not shown) are utilized on the storage devices, and that after the multiplier and the multiplicand are stored in the accumulator and multiplier latch register 10 and the multiplicand latch register 28, respectively, these gates are inhibited for the remainder of the multiplication operation. The first cycle of operation is commenced by applying a negative inhibit signal through the line 120 to the gates 74, a negative inhibit signal through the line 106 to the gates 102, a positive (shift zero) signal through the line 114 to the shift control latch register 70 and through the inverter 116 and the line 118 to the gates 66, a positive signal through the line 78 to the OR circuits 80, and by loading the multiplier from storage through the cable 46, the OR circuits 44 and the cable 48 to the acculator and multiplier latch register 10. The first latch control signal is applied to and removed from the latch control line 122. The inhibit signals applied to the gates 74 and 102 are removed, the shift zero signal is removed from the shift control latch register 70, the positive set signal through the line 78 to the OR circuits 80 is removed, and the multiplier is no longer applied through the cable 46. At this time, the contents of the accumulator and multiplier latch register 10 are as shown in row 1 in FIG. 2, and the output of the shifter 16 is as illustrated in row 2. The above operations clear the multiplicand latch register, store the initial shift count in the shift counter latch register 84, force a shift of zero into the shift control latch register 70, load the multiplier into the right half of the accumulator and multiplier latch register 10 and clear the left half of the accumulator and multiplier latch register 10. This was done in the following manner.

The inhibit signal applied through the line 120 to the gates 74 prevents any of the shift gates within the shifter 16 from being conditioned, and, therefore, all outputs of the shifter are zero. This prevents any data which may be present at the output of the latch register 10 from being entered into the accumulator and multiplier latch register 10, and allows only the multiplier to be stored therein. Hence, the multiplier is stored in the right half or multiplier portion of the accumulator and multiplier latch register 10, and the left half or occumulator portion of that latch register is clear (by applying no data input to the accumulator portion and applying and removing a latch control signal to that portion). Since the output of the shifter 16 is zero, the outputs of the OR circuits 44 are identical to their inputs from storage. The lines 50, 52 and 54 are negative.

The inhibit signal through the line 106 to the gates 102 prevents the output of the shift counter added from being applied through the OR circuits 80 to the shift counter latch register 84 as the initial shift count is applied to this register. The positive set signal applied through the line 78 to the OR circuits 80 sets the initial shift count into the shift control latch register 84 upon the occurrence of the first latch control signal on the line 122. The positive signal applied through the line 114 to the shift control latch register 70 stores an initial shift of zero in this latch register. At the same time this positive signal on the line 144 is inverted by the inverter 116 and applied to decondition the gates 66 to prevent the shift decoder 62 from indicating any shift to the shift control latch register 70.

During the first cycle the lines 52 and 54 supply negative signals to the exclusive OR circuit 56. The exclusive OR circuit 56 supplies a negative output (supplies a positive output only when only one input is positive) through the line 58 to the multiplicand gates 36. This negative signal applied to the gates 36 deconditions these gates and, therefore, no multiplicand is applied to the adders 24 in the first cycle. The output of the shifter 16 through the OR circuits 20 to the adders 24 also is zero, and, therefore, the outputs of the adders 24 are zero in the first cycle. The manner in which the exclusive OR circuit 56 supplies a positive add signal or a negative do not add signal will be better understood subsequently when a detailed discussion of the system is set forth.

At the beginning of the second cycle, the multiplicand is supplied from storage to the multiplicand latch register 28. Upon the occurrence of the second latch control signal on the line 122, through the gate 124 and the line 128 to the multiplicand latch register 28, the multiplicand is stored in this register. After the multiplicand is stored in the multiplicand latch register 28 (upon the termination of the second latch control signal) a negative inhibit signal is applied through the line 126 to the gate 124 for the remainder of the multiplication operation to prevent the subsequent latch control signals from destroying the multiplicand which is stored in the latch register 28.

In the first cycle, the shift decoder 62 senses certain outputs of the shifter 16 through the OR circuits 44 and the cable 60 to determine the next shift. This data that is sensed is illustrated in row 2, columns 31 through 35 in FIG. 2. Upon the occurrence of the second latch control signal the determined shift of three is stored in the shift control latch register 70. At this time (row 6, in FIG. 2) the shift control latch register 70 conditions gates within the shifter 16 to produce this shift of three. The shifter 16 serves to shift the data appearing at its output with respect to the data appearing at its input a number of positions. For example, when a shift of three is indicated by the output of the shift control latch register 70, gates within the shifter are conditioned and the data applied to the OR circuits 20 and the OR circuits 40 from the shifter 16 is shifted three positions to the right with respect to the data applied from the accumulator and multiplier latch register 10 to the shifter 16. When the next latch control signal is applied to the accumulator and multiplier latch register 10, the outputs of the OR circuits 44 are stored in the accumulator and multiplier latch register 10. Likewise, the outputs of the adders 24 are stored in the accumulator and multiplier latch register 10. The shifted data applied through the OR circuits 20 to the adders 24 is added with a form of the multiplicand (the true form in the second cycle), and the result of the addition is stored in the latch register 10 upon the occurrence of a latch control signal.

In the second cycle, for example, shown in FIGS. 2 and 3, the output of the accumulator portion of the latch register 10 is zero and this data is applied to the adders 24 along with the true form of the multiplicand. The result of the addition is applied through the cable 40 back to the latch register 10 and is stored within the latch register 10 upon the occurrence of the third latch control signal. Likewise, the outputs of the OR circuits 44 are stored in the latch register 10. In the meantime, the shift decoder 62 has sensed the outputs of certain of the OR circuits 44 to indicate that the next shift will be two. Upon the occurrence of the third latch control signal, this requested shift (a shift of two as noted in row 10 in FIG. 2) is stored in the shift control latch register 70. After the application of the third latch control signal, the shift control latch register 70 conditions gates within the shifter 16 to provide a shift of two. Hence, the data applied to the OR circuits 20 and 44 is shifted two positions to the right with respect to the data applied to the input of the shifter 16. The shifter 16 includes a circuit arrangement to insert ones when shifting a complement partial product, and to insert zeros when shifting a true partial product into any high order adder positions vacated as a result of shifting. The specific details of the operation of the shifter 16 will be more fully described later in connection with the detailed description of the present invention.

During each cycle the shift decoder 62 also applies the requested shift through the OR circuits 94 to the shift counter adder 96. The total shift available is applied from the shift counter latch register 84 through the cable 88*a* to the shift counter adder 90. The shift counter adder 90 serves to subtract the shift requested from the shift available and to provide a result which may be termed the remaining shift available. The remaining shift available is applied through the cable 100, the gates 102, the cable 108, the OR circuits 80 and the cable 82 to the input of the shift counter latch register 84. This remaining shift available is stored in the shift counter latch register 84 upon the occurrence of a latch control signal on the line 122. In certain instances the shift requested may be larger than the shift available. When this occurs, the line 104 from the shift counter adder 90 supplies signal to the shift decoder 92 to cause the shift decoder 62 to provide as an output the shift available rather than the shift requested. In this case the shift available is applied from the shift counter latch register 84 through the cable 86 to the shift decoder 62.

The operation of the multiplier continues in the manner described above. At the last cycle the output of the shift counter latch register 84 is zero. This condition is detected by the zero detector 110, and this detector provides a positive signal on the line 112. This positive signal is applied to a trigger (not shown) in equipment associated with the present multiplier to indicate that the present cycle is the last cycle of operation. Upon the completion of this cycle and the storage of the product in the accumulator and multiplier latch register 10, the multiply operation ceases. At this time the product is in correct form and in the proper positions (indicated in columns 3 through 34 in FIG. 3) in the accumulator and multiplier latch register 10. This product may be read from the latch register 10 and applied through a cable (not shown) to associated equipment.

The multiplier shown in block form in FIG. 1 is illustrated in detail in FIGS. 5 through 22. Dashed line boxes are employed throughout FIGS. 5 through 22 which correspond to the blocks in FIG. 1, and like reference numerals are utilized on both. The multiplicand latch register illustrated in block form in FIG. 1 is shown within dashed line box 28 in FIGS. 5 through 7. This multiplicand latch register 28 includes sixteen individual latch registers 172 through 187. Lines 192 through 207 are connected from a storage device (not shown) through the cable 26 to the respective latch registers 172 through 187. The lines 192 through 207 supply the true form of the multiplicand from a storage device to the multiplicand latch register 28. The latch control line 122 is connected through the gate 124 and the line 128 to each of the registers 172 through 187.

Figure 5:
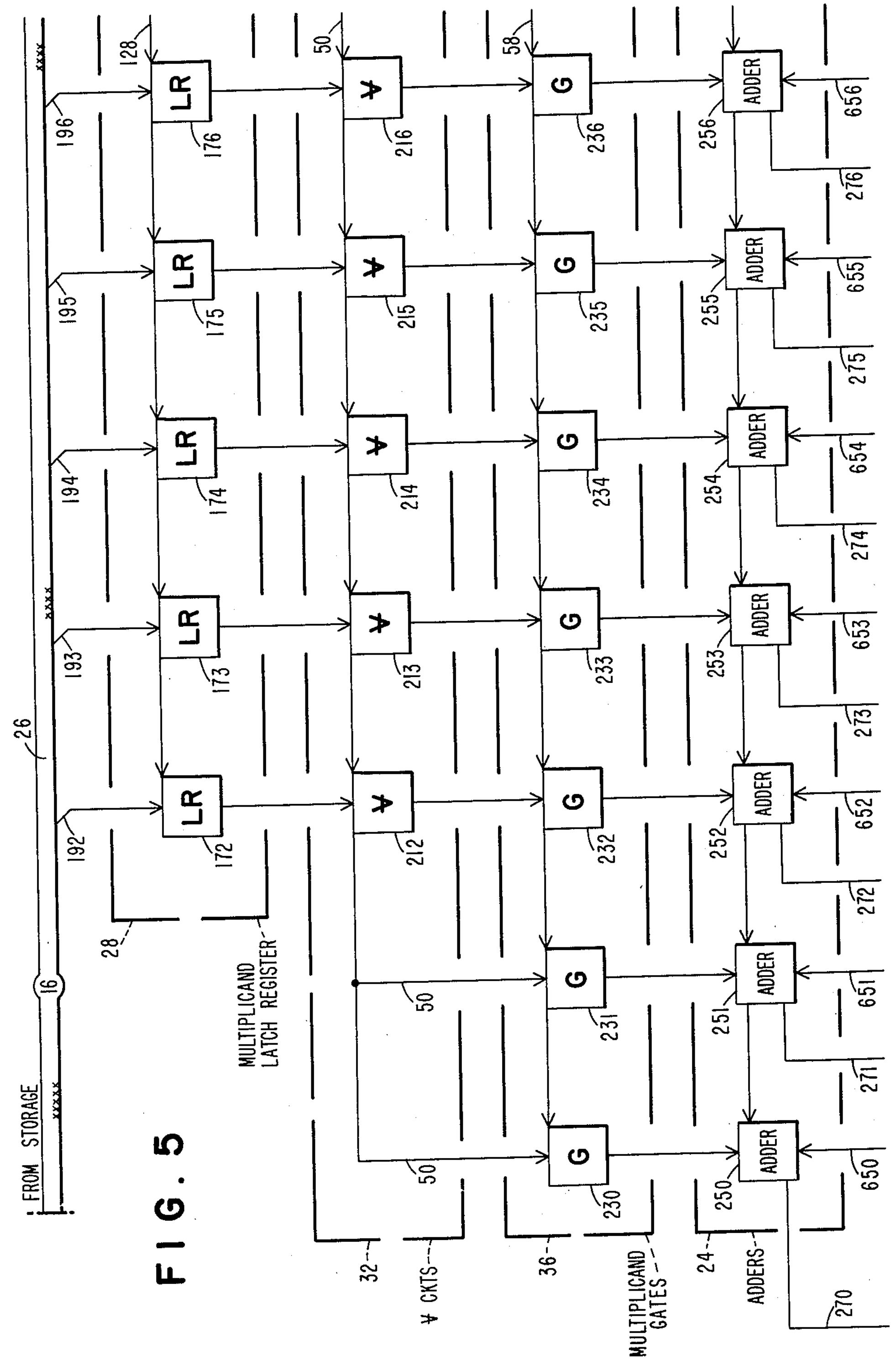
Figure 6:
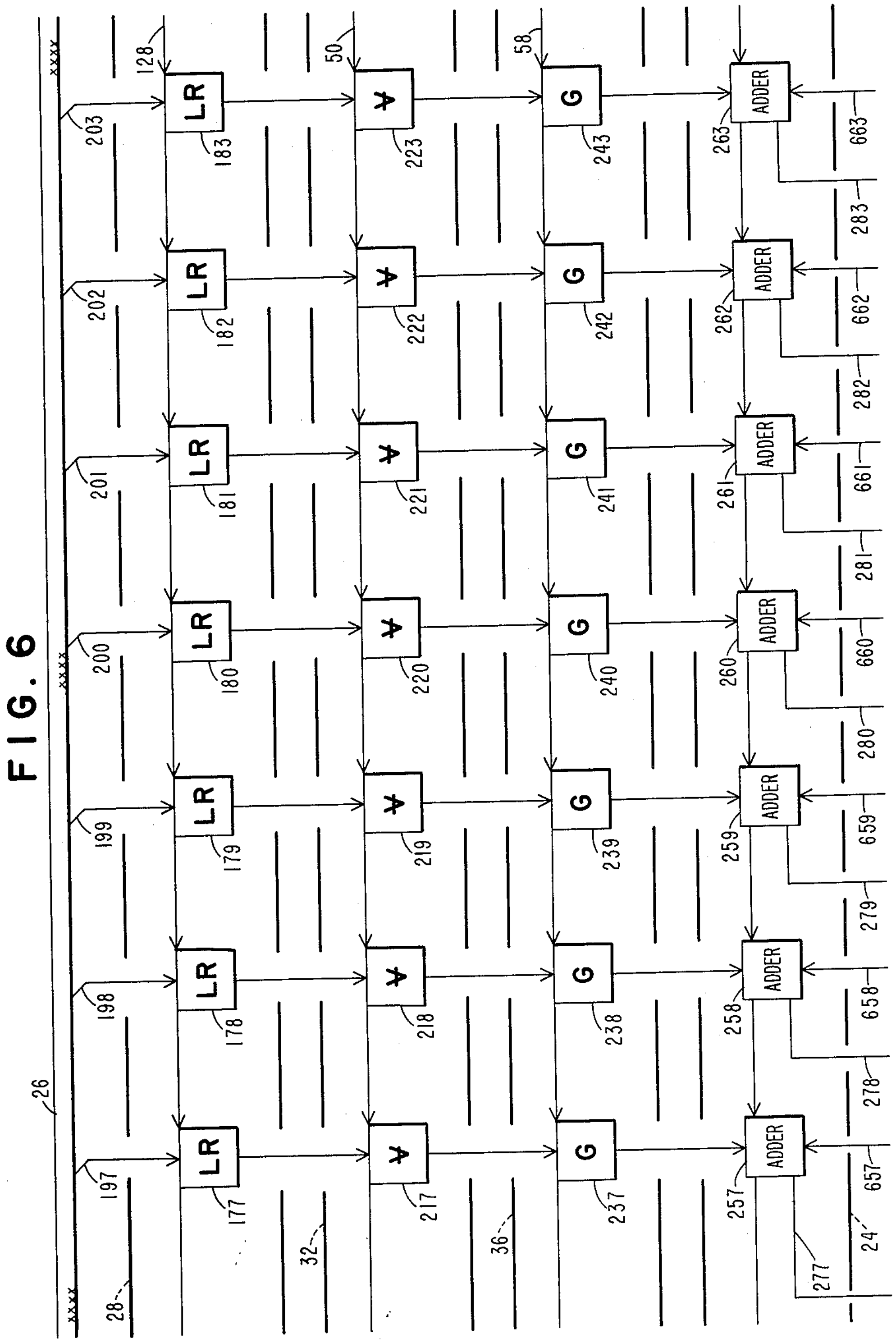
Figure 7:
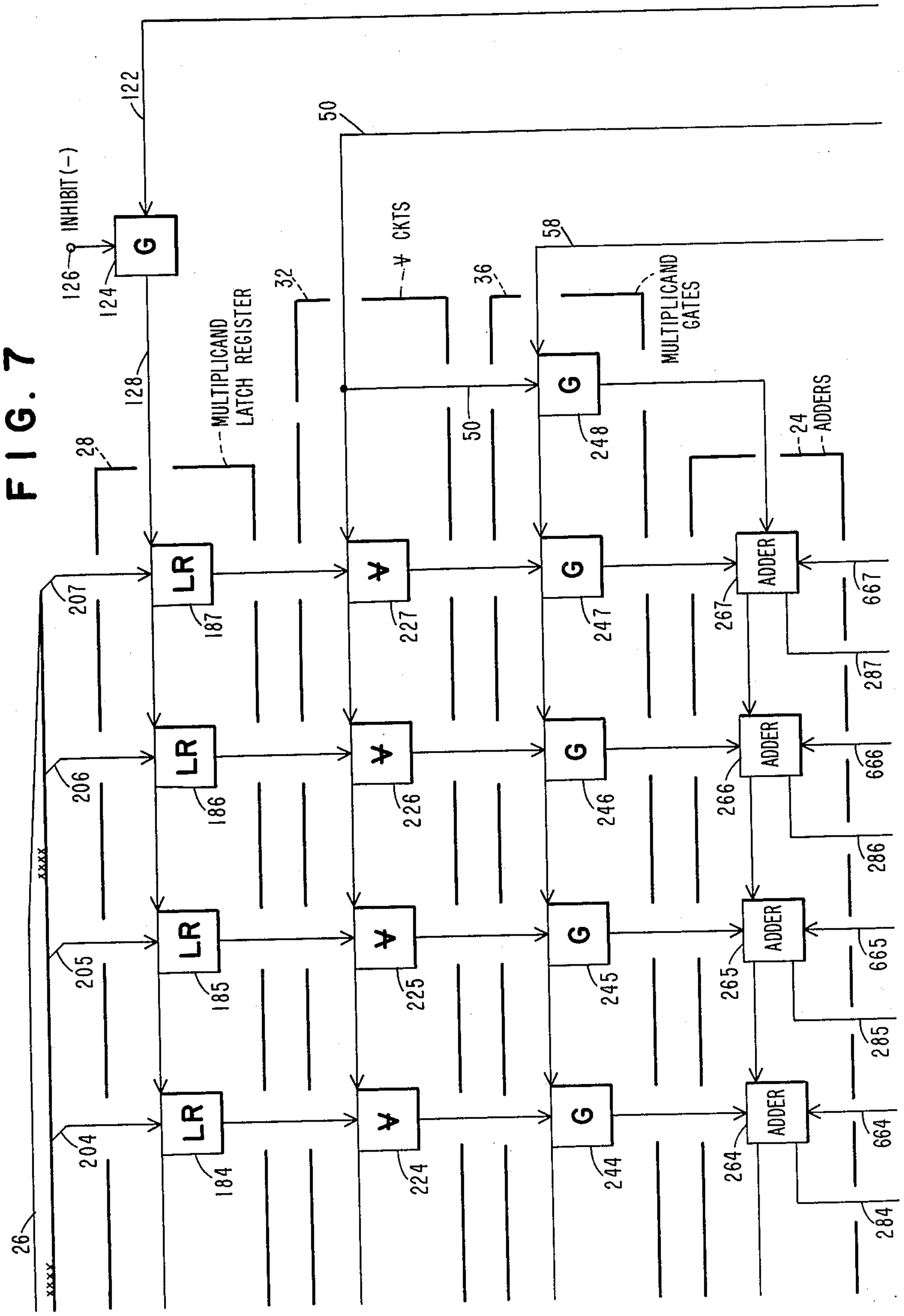

The outputs of the latch registers 172 through 187 are connected to respective exclusive OR circuits 212 through 227 in FIGS. 5 through 7. The outputs of the exclusive OR circuits 212 through 227 are connected to respective gates 232 through 247. The true/complement line 50 is connected to each of the exclusive OR circuits 212 through 227, and to gates 230 and 231 in FIG. 5 and a gate 248 in FIG. 7. The line 58 is connected to each of the gates 230 through 248.

The outputs of the gates 230 through 247 are connected to respective adders 250 through 267. The output of the gate 248 is connected to the adder 267. The outputs of the adders 250 through 267 are connected through respective lines 270 through 287 and the cable 40 to respective latch registers 290 through 307 in the accumulator and multiplier latch register shown within the dashed line box 10 in FIGS. 16 through 18.

Figure 16:
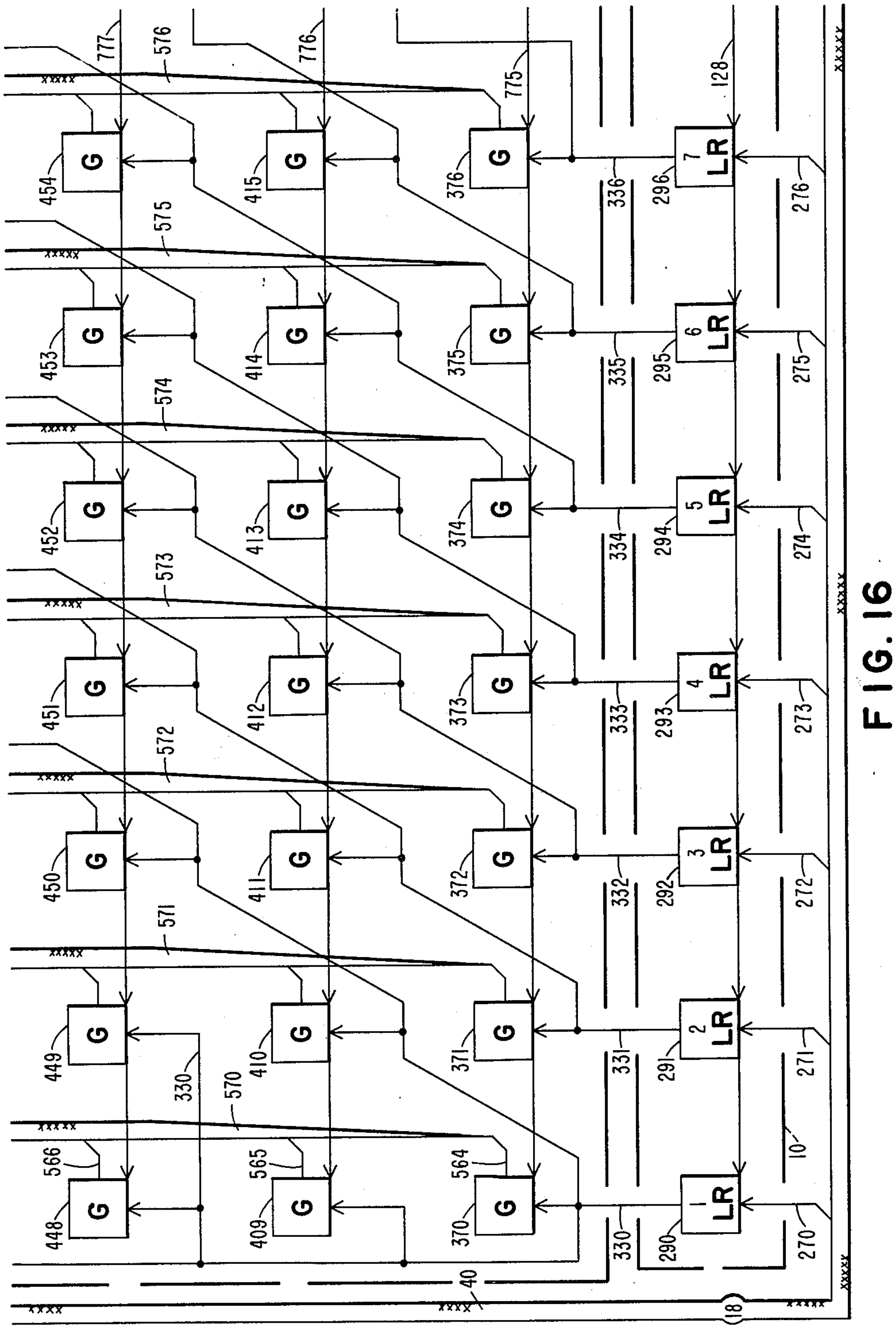
Figure 17:
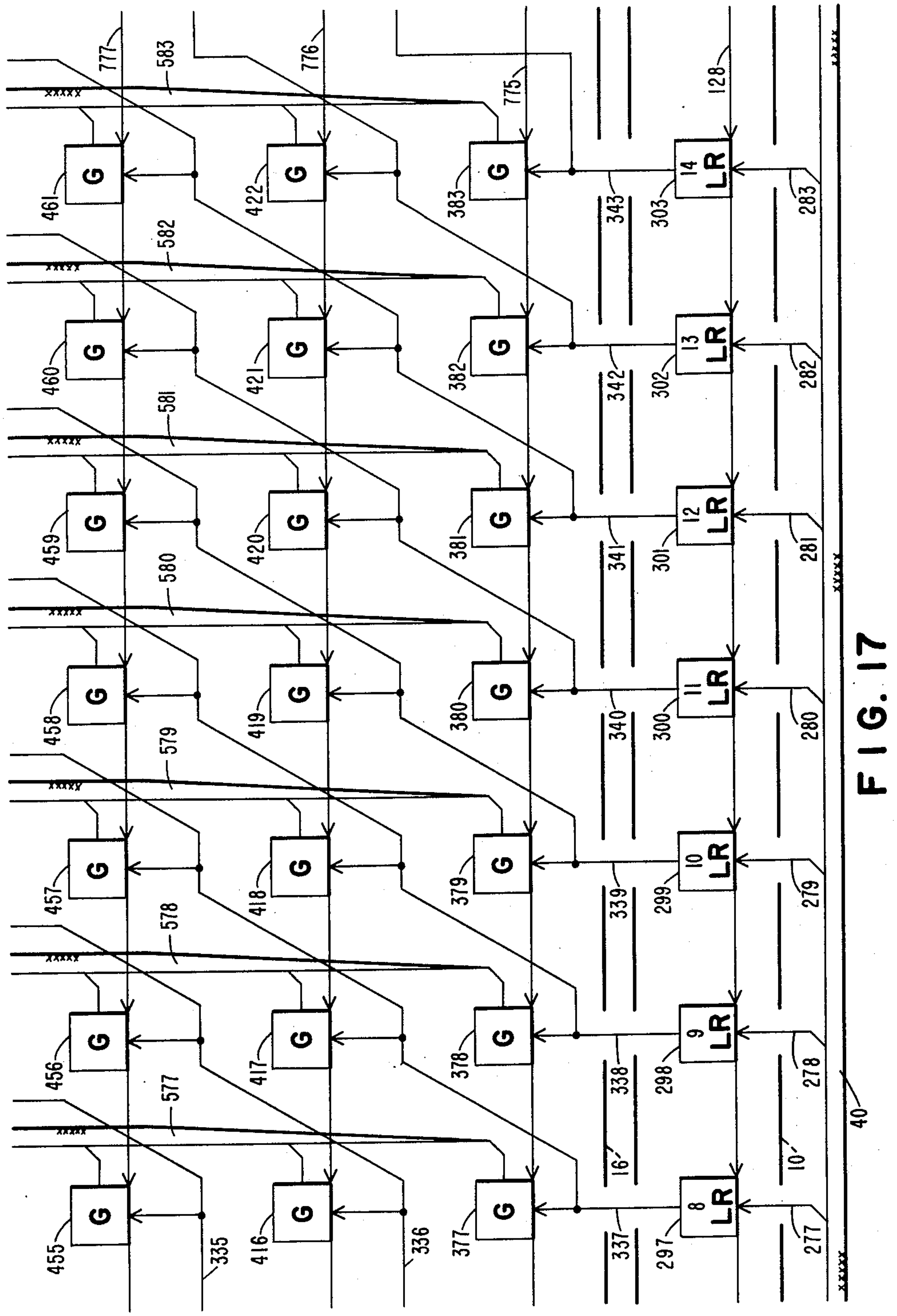

In addition to the latch registers 290 through 307, the accumulator and multiplier latch register 10 includes individual latch registers 308 through 325 shown in FIGS. 18 through 21. The outputs of the latch registers 290 through 325 in FIGS. 16 through 21 are connected through respective output lines 330 through 365 to shift zero gates 370 through 405, respectively. The output lines 330 through 365 are connected to respective shift one gates 410 through 445. The output lines 330 through 364 are connected to respective shift two gates 450 through 484. The lines 330 through 363 are connected to respective shift three gates 490 through 523 in FIGS. 8 through 13. The lines 330 through 362 are connected to respective shift four gates 530 through 562 in FIGS. 8 through 13. The output line 330 from the latch register 290 in FIG. 16 also is connected to a shift one gate 409 and shift two gates 448 and 449. The line 330 in FIG. 16 is connected to shift three gates 487 through 489, and shift four gates 526 through 529 in FIG. 8.

Figure 8:
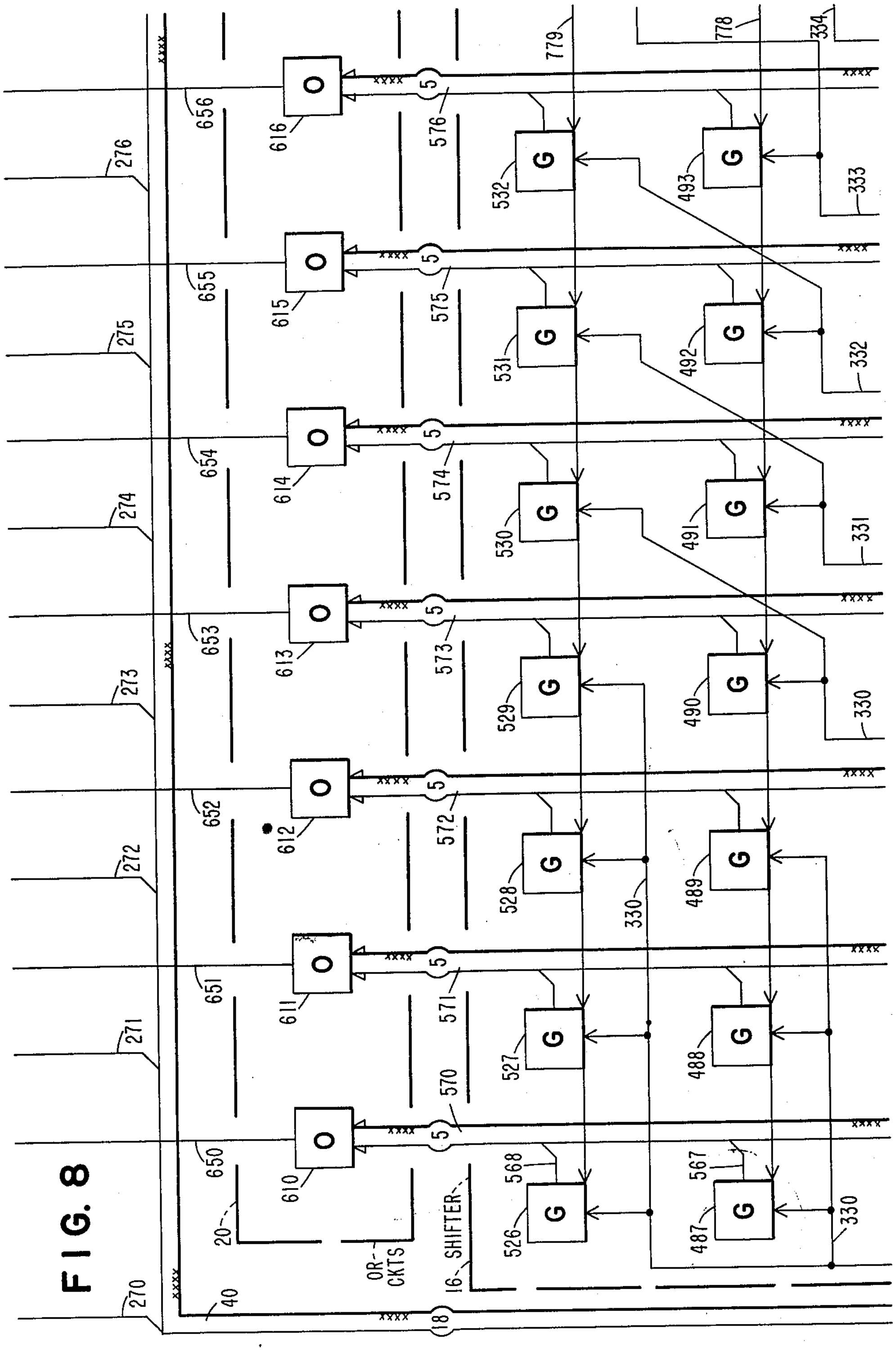
Figure 11:
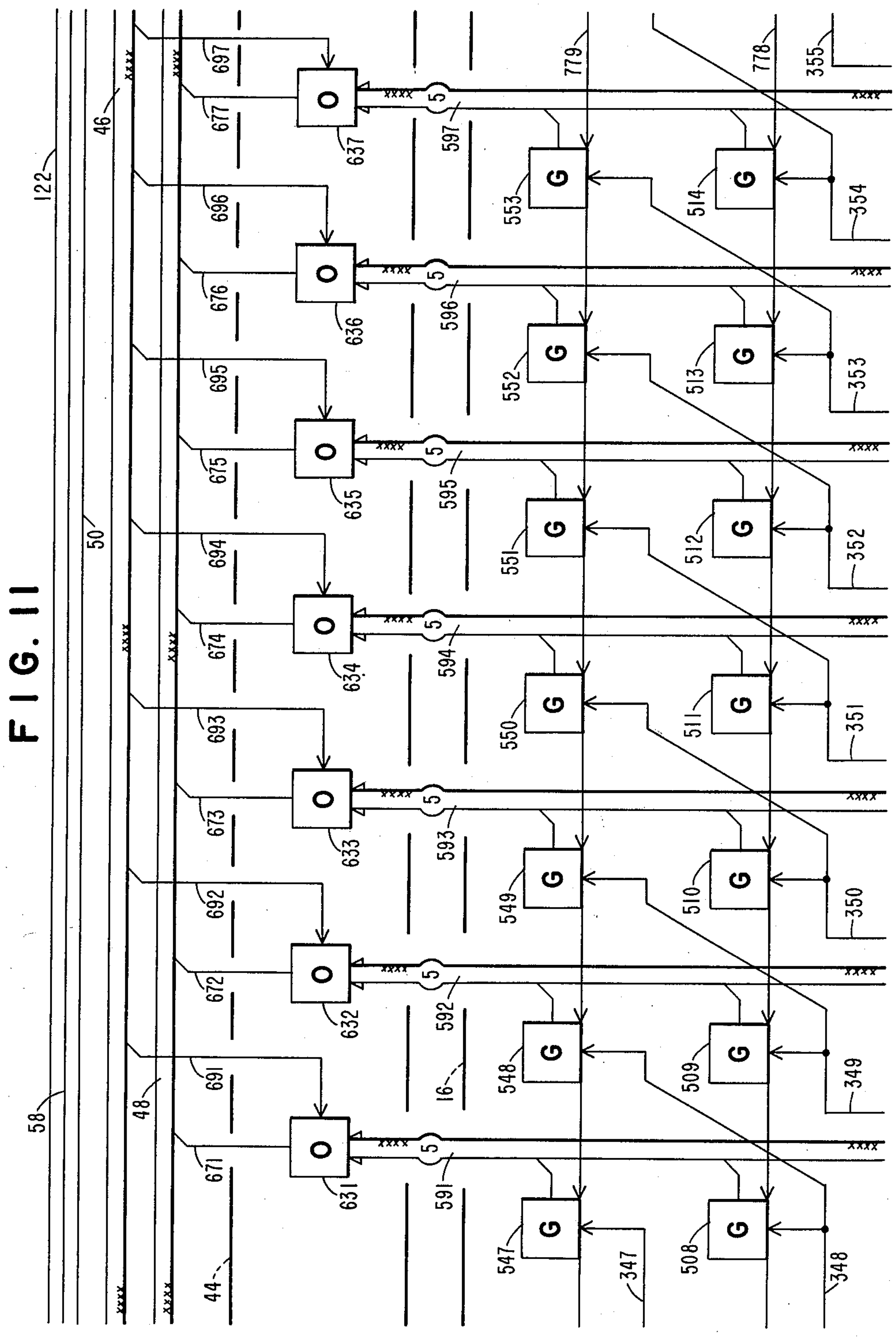
Figure 12:
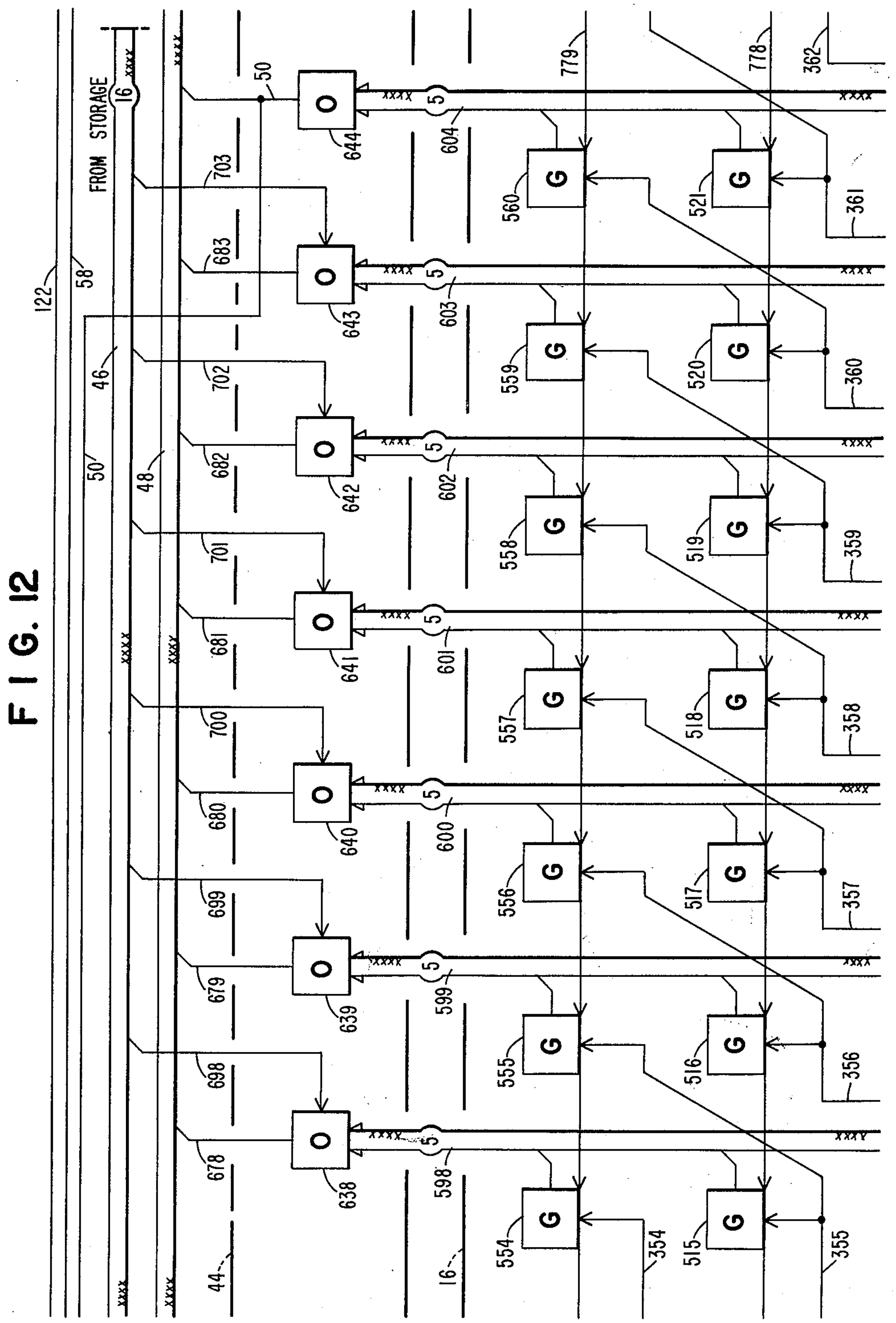
Figure 13:
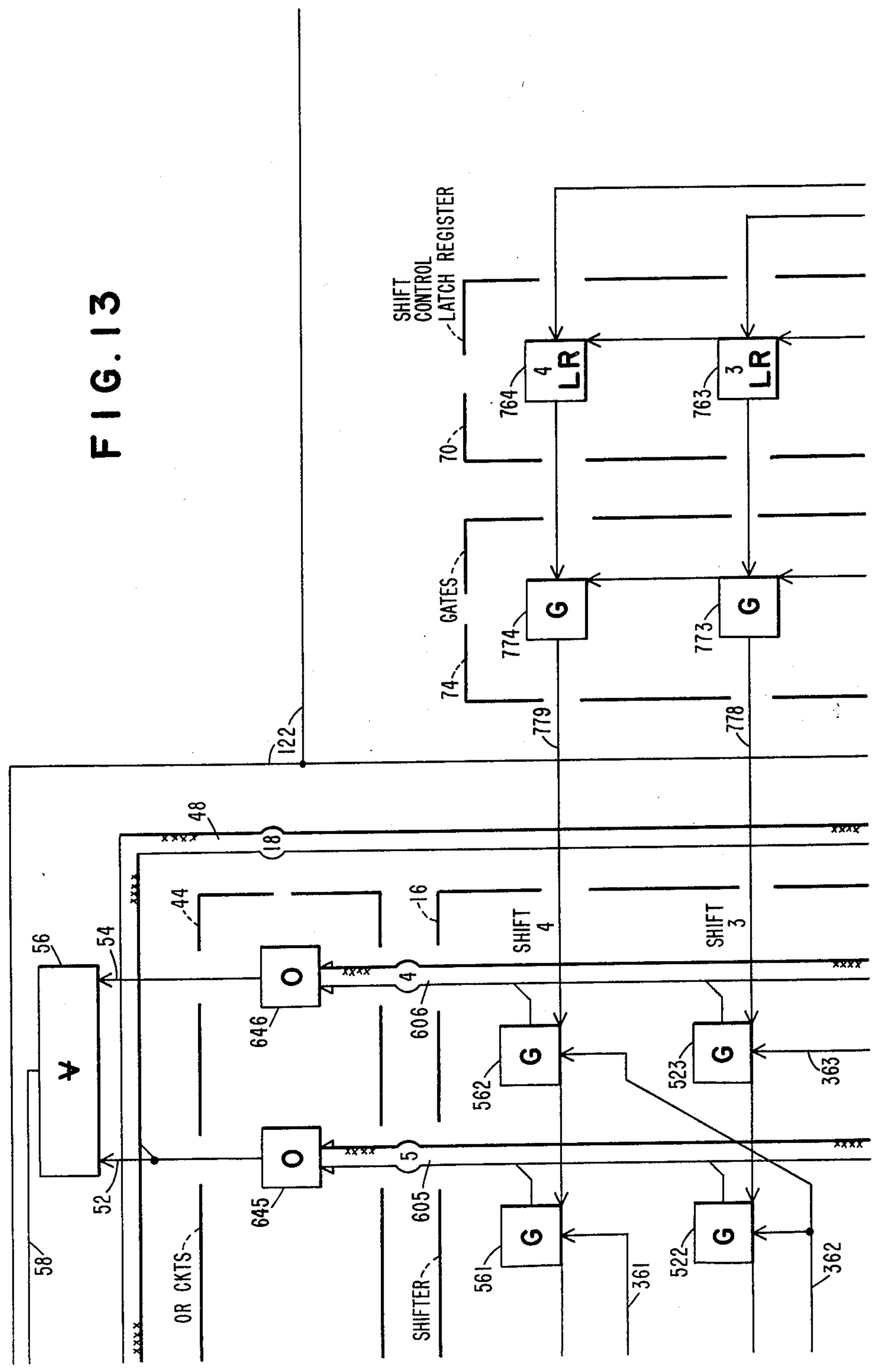

Each vertical string of shift gates is connected through a cable to one of the OR circuits within the dashed line box 20 or the dashed line box 44 in FIGS. 8 through 13. For example, the gates 370, 409 and 448 in FIG. 16, and the gates 487 and 526 in FIG. 8 are connected through respective lines 564 through 568 and a cable 570 to an OR circuit 610. Thus, the cable 570 (and the other similar cables) supplies five inputs to the OR circuit 610. The gates 371, 410 and 449 in FIG. 16, and the gates 488 and 527 in FIG. 8 are connected through a cable 571 to an OR circuit 611. In a like manner, the remaining strings of vertical gates in FIGS. 8 through 13 and FIGS. 16 through 21 are connected through cables 572 through 605 to respective OR circuits 612 through 645. The vertical string of gates 445 and 484 in FIG. 21, and 523 and 562 in FIG. 13 are connected through a cable 606 to an OR circuit 646.

Figure 9:
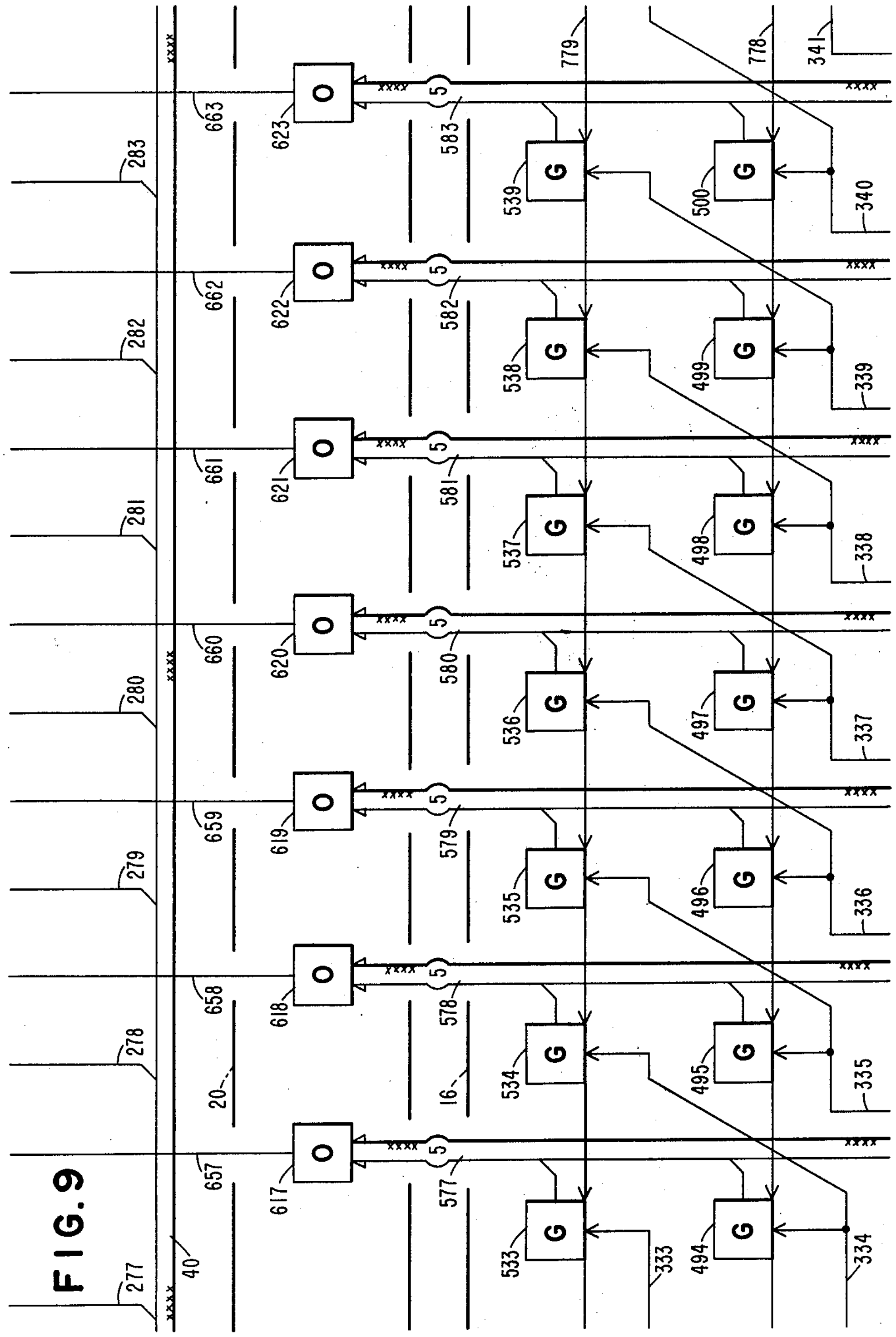
Figure 10:
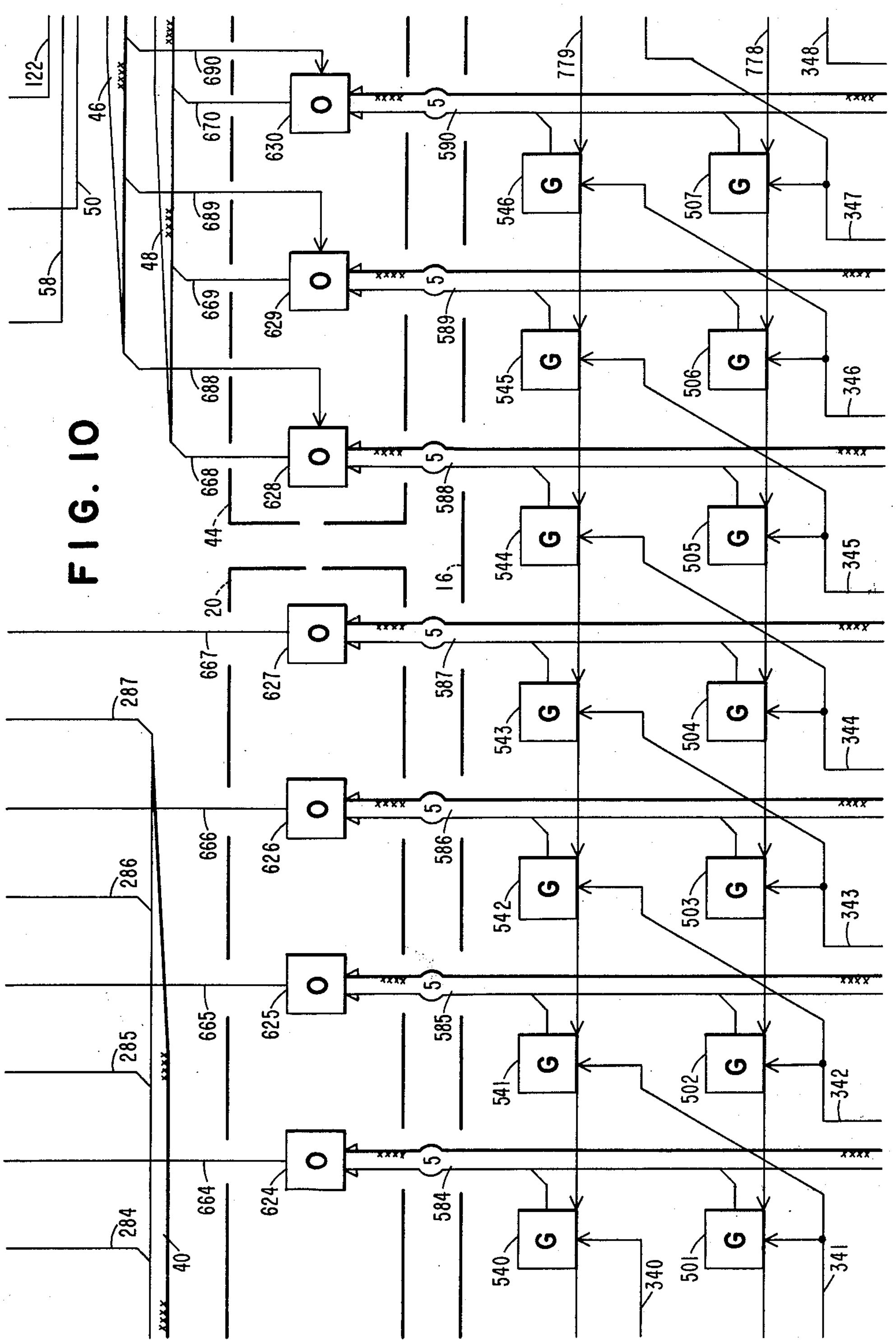

The OR circuits 610 through 627 in FIGS. 8 through 10 are connected through respective lines 650 through 667 to the adders 250 through 267, respectively, in FIGS. 5 through 7. The outputs of the OR circuits 628 through 643 in FIGS. 10 through 12 are connected through respective lines 668 through 683 and the cable 48 to the latch registers 308 through 323 in FIGS. 18 through 20. The output of the OR circuit 644 in FIG. 12 is connected through the line 50 and the cable 48 to the latch register 324 in FIG. 20. The output of the OR circuit 645 in FIG. 13 is connected through the line 52 and the cable 48 to the latch register 325 in FIG. 21. The output of the OR circuit 645 also is connected through the line 52 to the exclusive OR circuit 56. The output of the OR circuit 646 in FIG. 13 is connected through the line 54 to the exclusive OR circuit 56. The cable 46 is connected from a storage device (not shown) through lines 688 through 703 to the respective OR circuits 628 through 643 in FIGS. 10 through 12.

The output of the exclusive OR circuit 56 in FIG. 13 is connected through the line 58 to each of the gates 230 through 248 in FIGS. 5 through 7. The output of the OR circuit 644 in FIG. 12 also is connected through the line 50 to each of the exclusive OR circuits 212 through 227 in FIGS. 5 through 7, the gates 230 and 231 in FIG. 5, and the gate 248 in FIG. 7. The latch control line 122 is connected to each of the latch registers 290 through 325 in FIGS. 16 through 21, and this latch control line also is connected through the gate 124 and the line 128 to each of the latch registers 172 through 187 in FIGS. 5 through 7.

Figure 22:
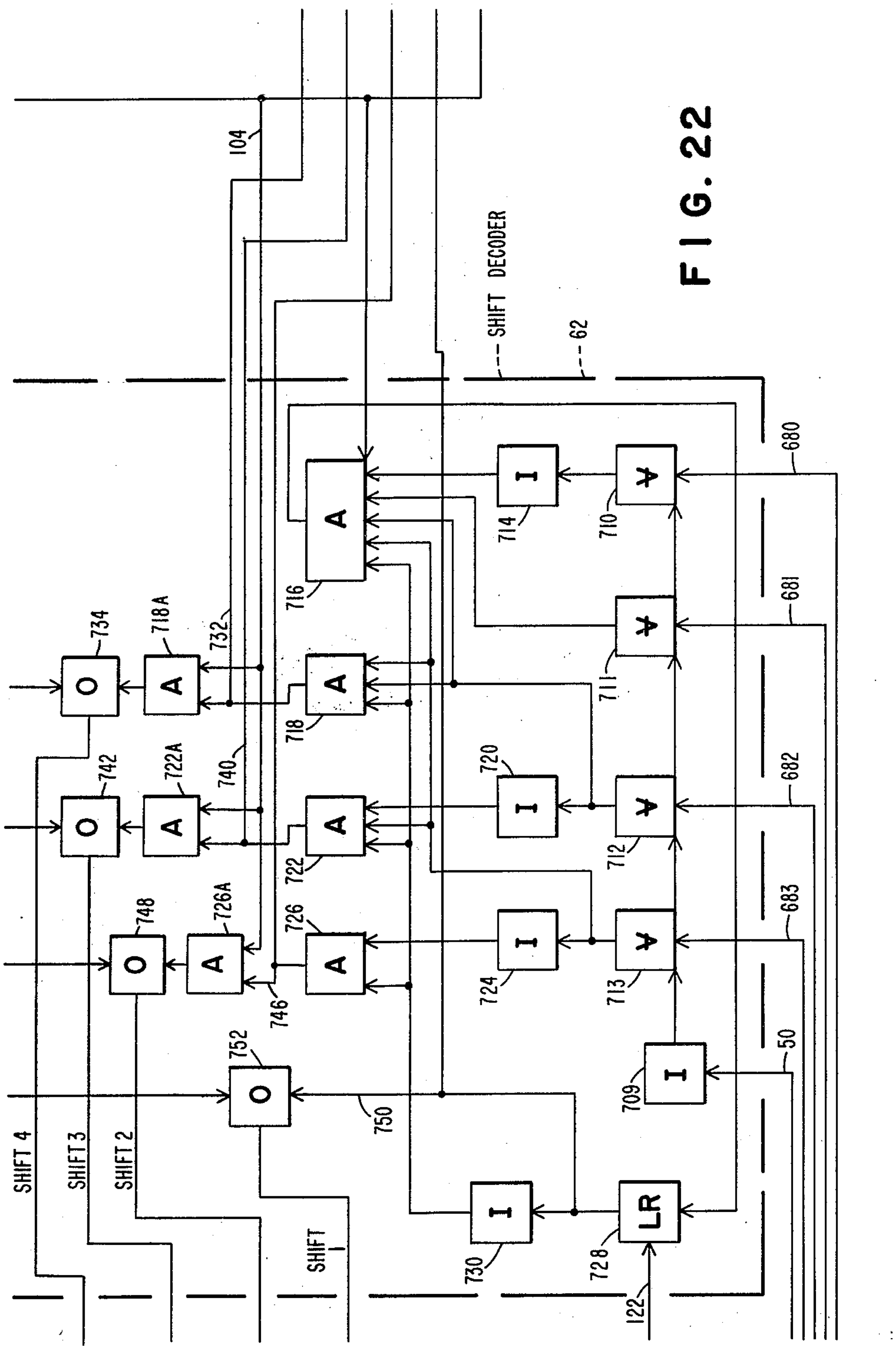

The output of the OR circuit 644 in FIG. 12 also is connected through the line 50 to an inverter 709 in the shift decoder shown within the dashed line box 62 in FIG. 22. The outputs of the OR circuits 640 through 643 in FIG. 12 are connected through the respective lines 680 through 683 to exclusive OR circuits 710 through 713, respectively, in FIG. 22. The output of the inverter 709 is connected to each of the exclusive OR circuits 710 through 713.

The output of the exclusive OR circuit 710 in FIG. 22 is connected through an inverter 714 to an AND circuit 716. The output of the exclusive OR circuit 711 is connected to the AND circuit 716. The output of the exclusive OR circuit 712 is connected to an AND circuit 718 and to the AND circuit 716. The output of the exclusive OR circuit 712 also is connected through an inverter 720 to an AND circuit 722. The output of the exclusive OR circuit 713 also is connected through an inverter 724 to an AND circuit 726. A latch register 728 is connected through an inverter 730 to each of the AND circuits 716, 718, 722 and 726. The output of the AND circuit 716 is connected as an input to the latch register 728.

Figure 15:
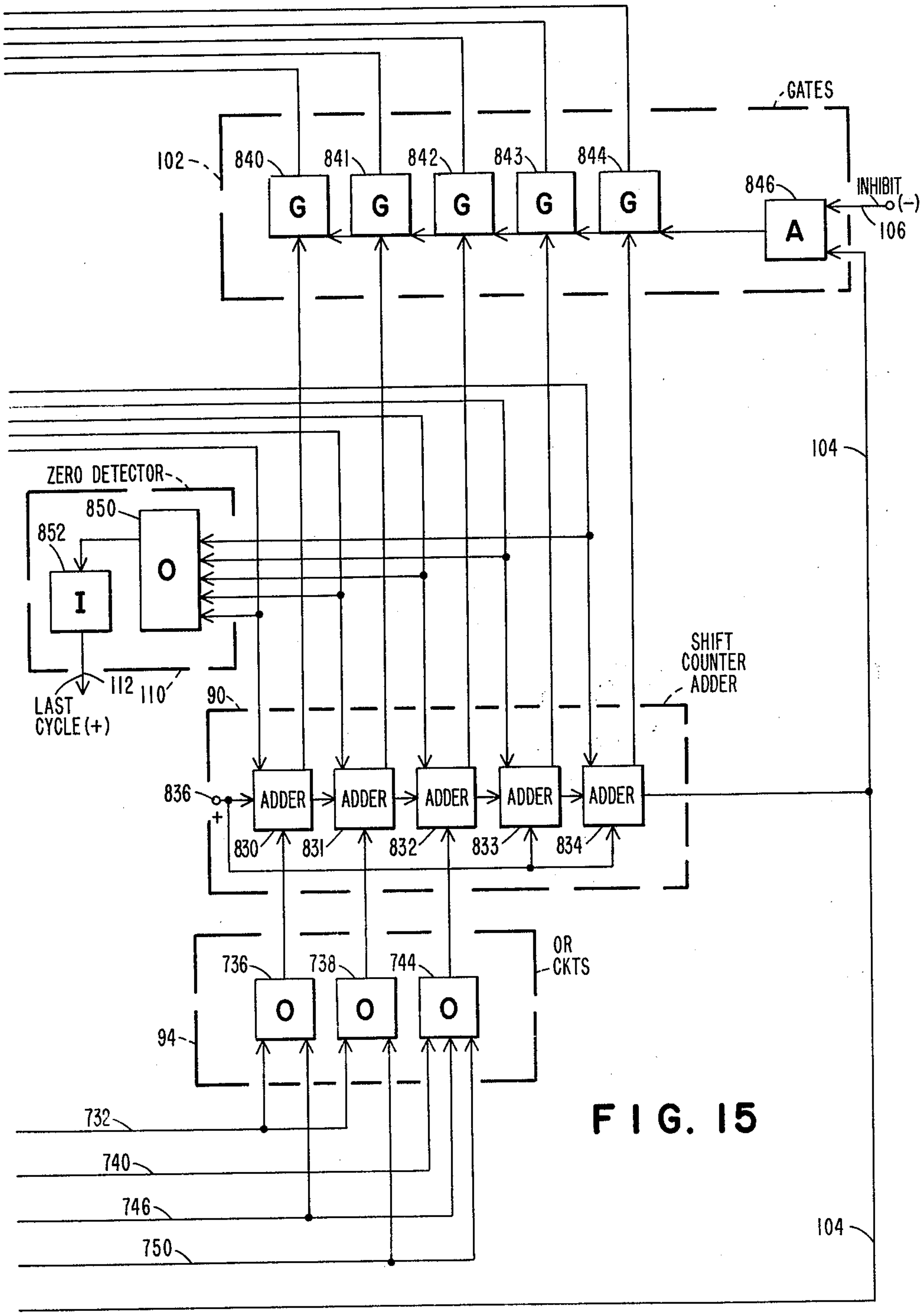

The output of the AND circuit 718 is connected through a line 732 to an AND circuit 718A in FIG. 22, and to OR circuits 736 and 738 in FIG. 15. The output of the AND circuit 722 is connected through a line 740 to an AND circuit 722A in FIG. 22, and to an OR circuit 744 in FIG. 15. The output of the AND circuit 726 is connected through a line 746 to an AND circuit 726A in FIG. 22, and to the OR circuits 736 and 744 in FIG. 15. The output of the latch register 728 in FIG. 22 is connected through a line 750 to an OR circuit 752 in FIG. 22, and to the OR circuits 738 and 744 in FIG. 15. The outputs of AND circuits 718A, 722A and 726A are connected respectively to OR circuits 734, 742 and 748.

Figure 21:
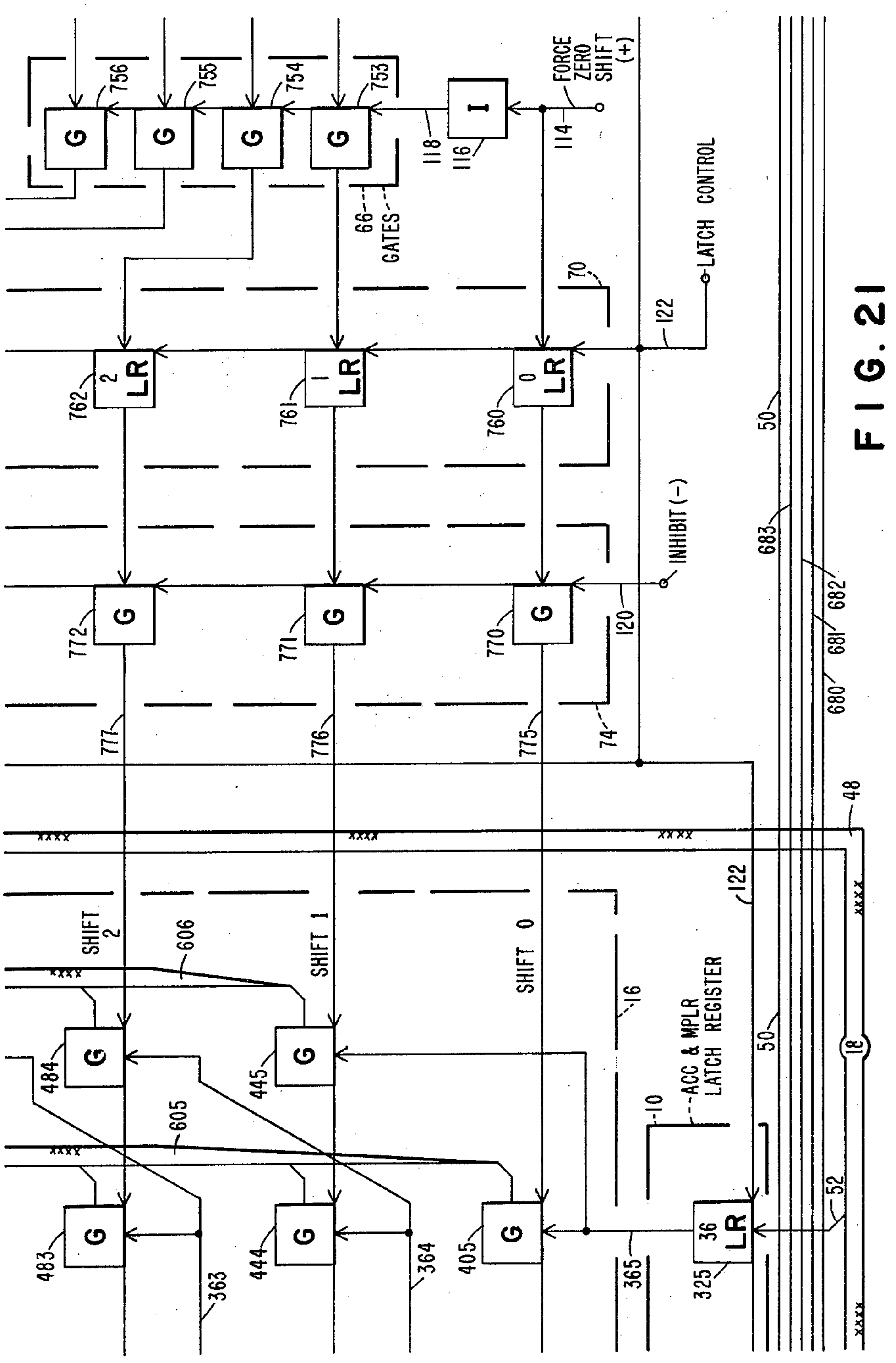

The outputs of the OR circuits 752, 748, 742 and 734 in FIG. 22 are connected to respective gates 753 through 756 in FIG. 21. The line 114 is connected through the inverter 116 to each of the gates 753 through 756. The line 114 also is connected to a shift zero latch register 760. The outputs of the gates 753 through 756 are connected to respective shift one, two, three and four latch registers 761 through 764 in FIGS. 21 and 13. The latch control line 122 is connected to each of the latch registers 760 through 764.

The outputs of the shift control latch registers 760 through 764 in FIGS. 21 and 13 are connected to respective gates 770 through 774. The output of the gate 770 in FIG. 21 is connected through a line 775 to each of the shift zero gates 370 through 405 in FIGS. 16 through 21. The output of the gate 771 is connected through a line 776 to each of the shift one gates 409 through 445 in FIGS. 16 through 21. The output of the gate 772 is connected through a line 777 to each of the shift two gates 448 through 484. The output of the gate 773 in FIG. 13 is connected through a line 778 to each of the shift three gates 487 through 523 in FIGS. 8 through 13. The output of the gate 774 is connected through a line 779 to each of the shift four gates 526 through 562. The inhibit line 120 is connected to each of the gates 770 through 774 in FIGS. 21 and 13.

Figure 14:
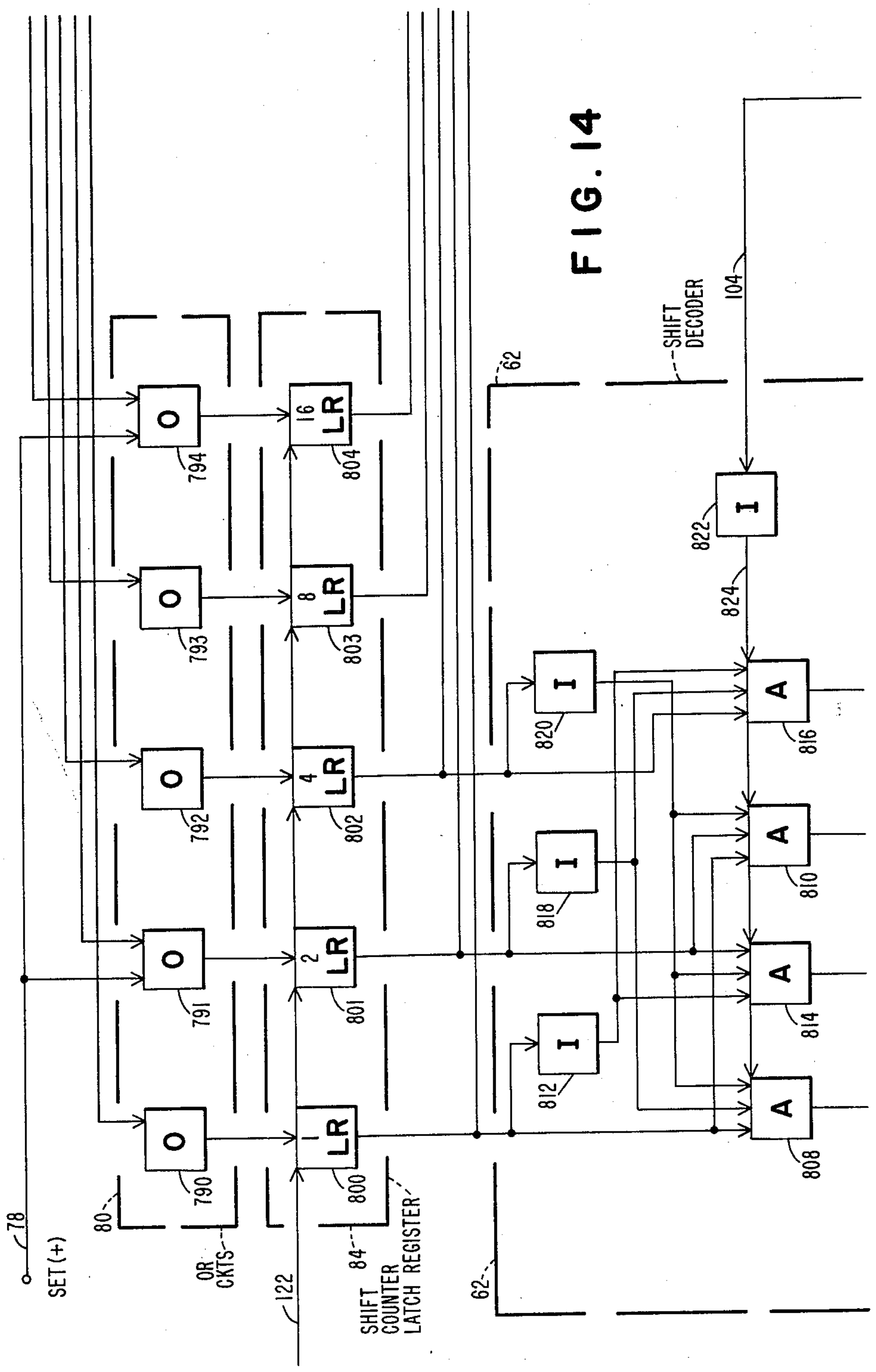

The set line 78 in FIG. 14 is connected to OR circuits 791 and 794. The OR circuits shown within the dashed line box 80 include OR circuits 790 through 794. The OR circuits 790 through 794 are connected to respective shift control latch registers 800 through 804. The latch control line 122 is connected to each of the latch registers 800 through 804. When the set line 78 is energized with a positive signal, an initial shift count is applied to the latch registers 800 through 804.

The output of the latch register 800 is connected to AND circuits 808 and 810. The output of the latch register 800 is connected through an inverter 812 to AND circuits 814 and 816. The output of the latch register 801 is connected to the AND circuits 810 and 814. The output of the latch register 801 is connected through an inverter 818 to the AND circuits 808 and 816. The output of the latch register 802 is connected to the AND circuit 816, and through an inverter 820 to the AND circuits 808, 810 and 814. The line 104 is connected through an inverter 822 and a line 824 to each of the AND circuits 808, 810, 814 and 816. The line 104 also is connected to each of the AND circuits 716, 718A, 722A and 726A in FIG. 22.

The outputs of the latch registers 800 through 804 are connected to respective adders 830 through 834 in FIG. 15. The OR circuit 736 in FIG. 15 is connected to the adder 830, the OR circuit 738 is connected to the adder 831, and the OR circuit 744 is connected to the adder 832. A line 836 is connected to each of the adders 830, 833 and 834.

The outputs from the adders 830 through 834 are connected to respective gates 840 through 844. The line 104 is connected from the adder 834 to an AND circuit 846. The inhibit line 106 is connected to and AND circuit 846. The output of the AND circuit 846 is connected to each of the gates 840 through 844. The outputs of the gates 840 through 844 are connected to the respective OR circuits 790 through 794 in FIG. 14.

The outputs of the latch registers 800 through 804 also are connected to an OR circuit 850 in the zero detector 110 in FIG. 15. The output of the OR circuit 850 is connected through an inverter 852 to the line 112. When the line 112 is positive, a trigger (not shown) in associated equipment is operated to indicate that the multiplication is in the last cycle of operation.

Figure 4B:
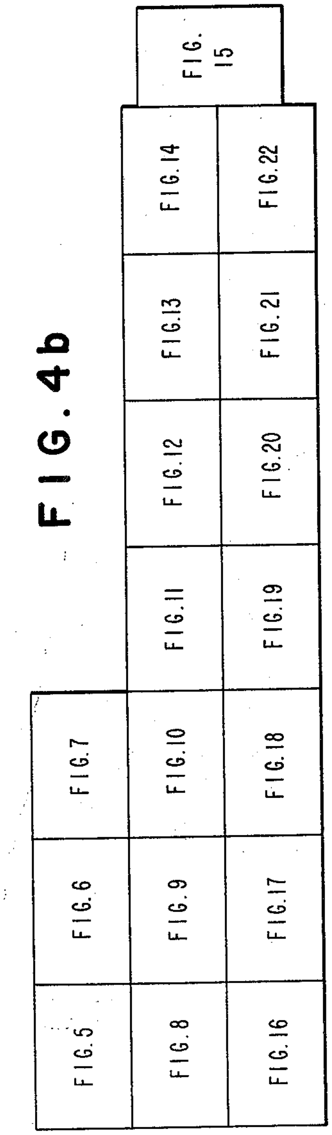

The detailed operation of the present multiplier now will be discussed with reference to FIGS. 5 through 22 arranged as illustrated in FIG. 4b and the table in FIGS. 2 and 3. The column numbers 1 through 36 in FIG. 2 correspond to the numbers in the individual latch registers 290 through 325 in FIGS. 16 through 21. As previously noted, it is assumed that the storage device or devices (not shown) include gates which serve to pass the multiplier and the multiplicand to their respective latch registers for a period of time long enough for the multiplier and the multiplicand to be stored. Initially, a negative inhibit signal is applied through the line 120 to the gates 770 through 774 in FIGS. 21 and 13, a negative inhibit signal is applied to the line 106 and through the AND circuit 846 to the gates 840 through 844 in FIG. 15, a positive signal is applied through the line 114 to the shift zero latch register 760 and through the inverter 116 to the gates 753 through 756 in FIG. 21, a positive signal is applied through the line 78 and the OR circuits 791 and 794 to the shift counter latch registers 801 and 804, and the multiplier is applied from storage through the cable 46 and the OR circuits 628 through 642 to the respective latch registers 308 through 323 in FIGS. 18 through 20. The negative inhibit signal applied through the line 120 to the gates 770 through 774 in FIGS. 21 and 13 serves to decondition these gates. Hence, none of the shift lines 775 through 779 conditions the shift gates in the shifter, and the inputs to the OR circuits 610 through 646 from the shifter are all zero, or negative. The inhibit signal applied to the gates 840 through 844 serves to decondition these gates so that whatever output may be present from the shift counter adders 830 through 834 will not be applied through the OR circuits 790 through 794 to the respective shift counter latch registers 800 through 804. The positive signal applied through the line 114 to the shift zero latch register 760 forces a shift of zero for the first cycle into that latch register. This positive signal on the line 114 is inverted by the inverter 116 and applied through the line 118 to the gates 753 through 756 in FIG. 21. The output of the inverter 116 deconditions the gates 753 through 756 so that no other shift will be applied from the shift decoder in FIGS. 14 and 22 to the shift control latch register 70. The positive signal applied through the line 78 and the OR circuits 791 and 794 to the shift counter latch registers 801 and 804 serves to store a shift count of eighteen in these latch registers. A positive signal is applied through the line 836 to the shift counter adders 830 and 833 through 834 throughout the multiplication operation. Since no shift line 775 through 779 is up initially, the outputs of the OR circuits 645 and 646 in FIG. 13 are negative. Hence, the output of the exclusive OR circuit 56 is negative. The exclusive OR circuit 56 serves to provide a positive output only when only one of its inputs is positive. The negative output of the exclusive OR circuit 56 is applied through the line 58 to decondition the gates 230 through 248 in FIGS. 5 through 7. Hence, only zero inputs are applied to the addess 250 through 267 from the gates 230 through 248. The OR circuits 610 through 627 supply zeros to the adders 250 through 267. The outputs of the adders 250 through 267 are zero and these outputs are applied to the accumulator latch registers 290 though 307 in FIGS. 16 through 18. The first latch control signal is applied through the line 122. This latch control signal stores a shift of zero in the latch register 760 in FIG. 21. Also a shift count of eighteen is stored in the shift counter latch registers 800 through 804 in FIG. 14, and the multiplier is stored in the latch registers 308 through 323 in FIGS. 18 through 20. Zeroes are stored in the latch registers 324 and 325 in FIGS. 20 and 21 since all inputs to the OR circuits 644 and 645 in FIGS. 12 and 13 were negative. This operation also serves to clear the latch registers 290 through 307 since only zero inputs were applied to these latch registers during the occurrence of a latch control signal. Likewise, the multiplicand latch registers 172 through 187 are cleared in the first cycle since no data is applied to these latch registers.

After the termination of the first latch control signal on the line 122, the inhibit signals are removed from the lines 120 and 106, the positive shift zero signal is removed from the line 114, the positive set signal is removed from the line 78, and the multiplier no longer is applied from storage through the cable 46. Since a shift of zero was stored in the shift zero latch register 760 in FIG. 21, this latch register applies a positive output through the gate 770 and the line 775 to the shift zero gates 370 through 405 in FIGS. 16 through 21. Since these shift zero gates now are conditioned, the data appearing at the outputs of the latch registers 290 through 325 is applied through the respective gates 370 through 405 to the OR circuits 610 through 645, respectively. At this time the contents of the latch registers 290 through 325 are as illustrated in row 1, columns 1 through 36 of FIG. 2, and the outputs of the OR circuits 610 through 646 are as illustrated in row 2, columns 1 through 37 in FIG. 2.

The outputs of OR circuits 640 through 644 in FIG. 12 are applied through the respective lines 680 through 683 and 50 to the shift decoder 62 in FIG. 22. The shift decoder 62 decodes the data appearing on these lines to provide an output shift request. The data applied to the shift decoder 62 through the lines 680 through 683 and 50 is shown in row 2, columns 31 through 35 in FIG. 2. A negative signal (a zero) is applied through the line 50 to the inverter 709 in FIG. 22. The inverter provides a positive output signal to each of the exclusive OR circuits 710 through 713. The line 683 supplies a negative signal to the exclusive OR circuit 713, the line 682 supplies a positive signal to the exclusive OR circuit 712, the line 681 supplies a negative signal to the exclusive OR circuit 711, and the line 680 supplies a positive signal to the exclusive OR circuit 710. When a positive signal is applied from the inverter 709 to the exclusive OR circuits 710 through 713, these exclusive OR circuits provide outputs which are complements of their inputs. Hence, the exclusive OR circuit 713 provides a positive output, the exclusive OR circuit 712 provides a negative output, the exclusive OR circuit 711 provides a positive output and the exclusive OR circuit 710 provides a negative output. The positive output of the exclusive OR circuit 713 is inverted to a negative signal by the inverter 724 and applied to the AND circuit 726. The positive output of the exclusive OR circuit 713 also is applied to each of the AND circuits 716, 718 and 722. The negative output of the exclusive OR circuit 712 is inverted to a positive signal by the inverter 720 and applied to the AND circuit 722. The negative output of the exclusive OR circuit 712 also is applied to the AND circuits 716 and 718. At this time the line 104 from the adder 835 in the shift counter adder in FIG. 15 supplies a positive signal to each of the AND circuits 716, 718A, 722A and 726A. The output of the latch register 728 is negative, and this negative output is inverted to a positive signal by the inverter 730 and applied to the AND circuits 716, 718, 722 and 726. Hence, only the AND circuit 722 has all positive inputs. The AND circuit 722 provides a positive shift three signal through the AND circuit 722A and the OR circuit 742 and the gate 755 in FIG. 21 to the shift three latch register 763 in FIG. 13. The output of the AND circuit 722 also is applied through line 740 to the OR circuit 744 in FIG. 15. The purpose of this will be described subsequently.

The outputs of the OR circuits 745 and 746 in FIG. 13 supply negative signals through the lines 52 and 54 to the exclusive OR circuit 56. Hence, the exclusive OR circuit 56 supplies a negative signal through the line 58 to each of the gates 230 through 248 in FIGS. 5 through 7. This negative signal deconditions these gates, and whenever these gates are deconditioned, no addition takes place. The multiplicand now is made available from storage through the cable 26 to the multiplicand latch registers 172 through 187 in FIGS. 5 through 7. The second latch control signal is applied to the line 122 and subsequently removed. The application of the second latch control signal stores the multiplicand in the multiplicand latch registers 172 through 187. After the multiplicand is stored in these latch registers, a negative inhibit signal is applied through the line 126 to the gate 124 in FIG. 7 to prevent any further latch control signals from destroying the multiplicand stored in the multiplicand latch register. When the second latch control signal was applied, the outputs of the OR circuits 628 through 645 in FIGS. 10 through 13 were applied to the respective latch registers 308 through 325 in FIGS. 18 through 21. This caused the data appearing at the inputs of the latch registers 308 through 325 to be stored therein. Also the second latch control signal caused the shift three request to be stored in the shift control latch register 763 in FIG. 13.

During the first cycle, the total shift count of eighteen was applied from the shift counter latch registers 800 through 804 in FIG. 14 to the shift counter adders 830 through 834. The shift requested was applied from the shift decoder through the line 740 and the OR circuit 744 to the adder 832. The adders 830 through 834 serve to subtract the shift requested from the shift available and provide the remaining shift available back to the shift counter latch registers 800 through 804 in FIG. 14. Since an initial shift count of eighteen was stored in the shift counter latch registers 800 through 804, the outputs of the latch registers 801 and 804 were positive. These outputs were applied to the respective adders 831 and 834. The line 740 and the OR circuit 744 supplied a positive input to the adder 832. The latch registers 800, 802 and 803 supplied negative inputs to the respective adders 830, 832 and 833. The OR circuits 736 and 738 supplied negative inputs to the adders 830 and 831. The line 836 provides a positive input to the adders 830 and 833 through 834. The adder 830 receives one positive input and provides a positive output to the gate 840 and a negative carry to the adder 831. The adder 831 receives one positive input and provides a positive output to the gate 841 and a negative carry to the adder 832. The adder 832 receives one positive input and provides a positive output to the gate 842 and a negative carry to the adder 833. The adder 833 receives one positive input and provides a positive output to the gate 843 and a negative carry to the adder 834. The adder 834 receives two positive inputs and provides a negative output to the gate 844 and a positive carry to the line 104. The gates 840 through 844 apply the outputs of the respective adders 830 through 834 through the respective OR circuits 790 through 794 in FIG. 14 to the latch registers 800 through 804, respectively. The inputs to the latch registers 800 through 803 were positive, and the inputs to the latch register 804 were negative. When the second latch control signal was applied to the line 122, these inputs were stored in the latch registers 800 through 804 indicating a remaining shift available of fifteen. Upon the application of this second latch control signal, row 5, columns 1 through 36 in FIG. 2 show the contents of the latch registers 290 through 325, and row 6, columns 1 through 37 show the outputs of the OR circuits 610 through 645. Row 5 in the lefthand portion of FIG. 2 illustrates the contents of the shift counter latch register.

Figure 20:
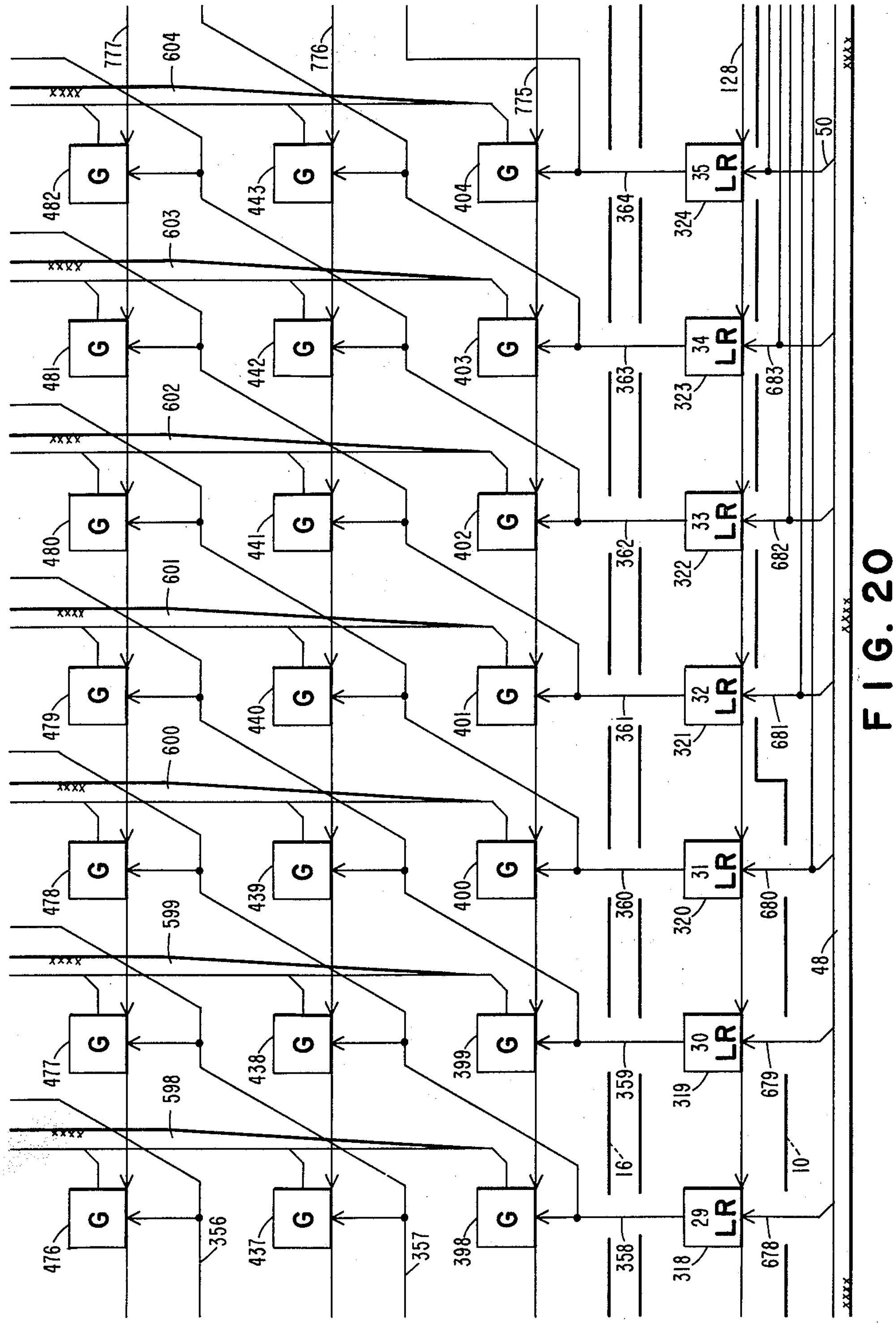

At this time, the shift three latch register 763 in FIG. 13 provides a positive signal through the gate 773 and the line 778 to condition the shift three gates 487 through 523. The output of the latch register 322 (row 5, column 33 in the table in FIG. 2) is applied through the line 362 and the gate 522 to the OR circuit 645. The output of the latch register 323 is applied through the line 363 and the gate 523 to the OR circuit 646. Hence a positive input is applied to the OR circuit 645 and this OR circuit provides a positive output through the line 52 to the exclusive OR circuit 56. Since only the shift three gates are conditioned, and the gate 523 supplies a negative signal to the OR circuit 646 in FIG. 13, all of the inputs to this OR circuit are negative. Hence, the OR circuit 646 supplies a negative signal through the line 54 to the exclusive OR circuit 56. The exclusive OR circuit 56 supplies a positive output through the line 58 to condition each of the gates 230 through 248 in FIGS. 5 through 7. The output of the latch register 321 in FIG. 20 is applied through the line 361 and the gate 521 to the OR circuit 644. The output of the latch register 321 is negative and, therefore, the output of the OR circuit 644 is negative. This negative output is applied through the line 50 to each of the exclusive OR circuits 212 through 227 in FIGS. 5 through 7. When a negative input is applied to these exclusive OR circuits, they provide outputs corresponding to their inputs. The negative signal applied through the line 50 to the exclusive OR circuits 212 through 227 causes the true form of the multiplicand to be added in this cycle.

The multiplicand is applied from the latch registers 172 through 187 in FIGS. 5 through 7 through the respective exclusive OR circuits 212 through 227 and the respective gates 232 through 247 to the respective adders 252 through 267. The line 50 supplies a negative signal through the gates 230 and 231 to the respective adders 250 and 251. It should be noted that two extra adder (and gate) positions are included to the left of the high order bit of the multiplicand. This arrangement is provided to make it possible to tell whether the result of an addition is in true or complement form from the output of the first adder (adder 250). When the output of adder 250 is a zero, the output of the adders is in true form, and when it is a one the output is in complement form. The line 50 also supplies a negative signal through the gate 248 to the adder 267. When the true form of the multiplicand is utilized, the gates 230, 231 and 248 supply negative signals to the adders 250, 251 and 267, and positive signals to these adders when the complement form of the multiplicand is utilized. When the complement form of the multiplicand is utilized, the gate 248 supplies a positive signal to the adder 267 to force a one into this adder position to provide the two's complement of the multiplicand. In the present second cycle the outputs of the OR circuits 610 through 627 in FIGS. 8 through 10 are negative and, therefore, the adders 250 through 267 receive only the multiplicand in this cycle. The outputs of the adders 250 through 267 are applied through respective lines 270 through 287 to the inputs of the latch registers 290 through 307, respectively, in FIGS. 16 through 18. Upon the occurrence of the third latch control signal on the line 122, the data appearing at the inputs of the latch registers 290 through 307 will be stored in these latch registers.

Figure 18:
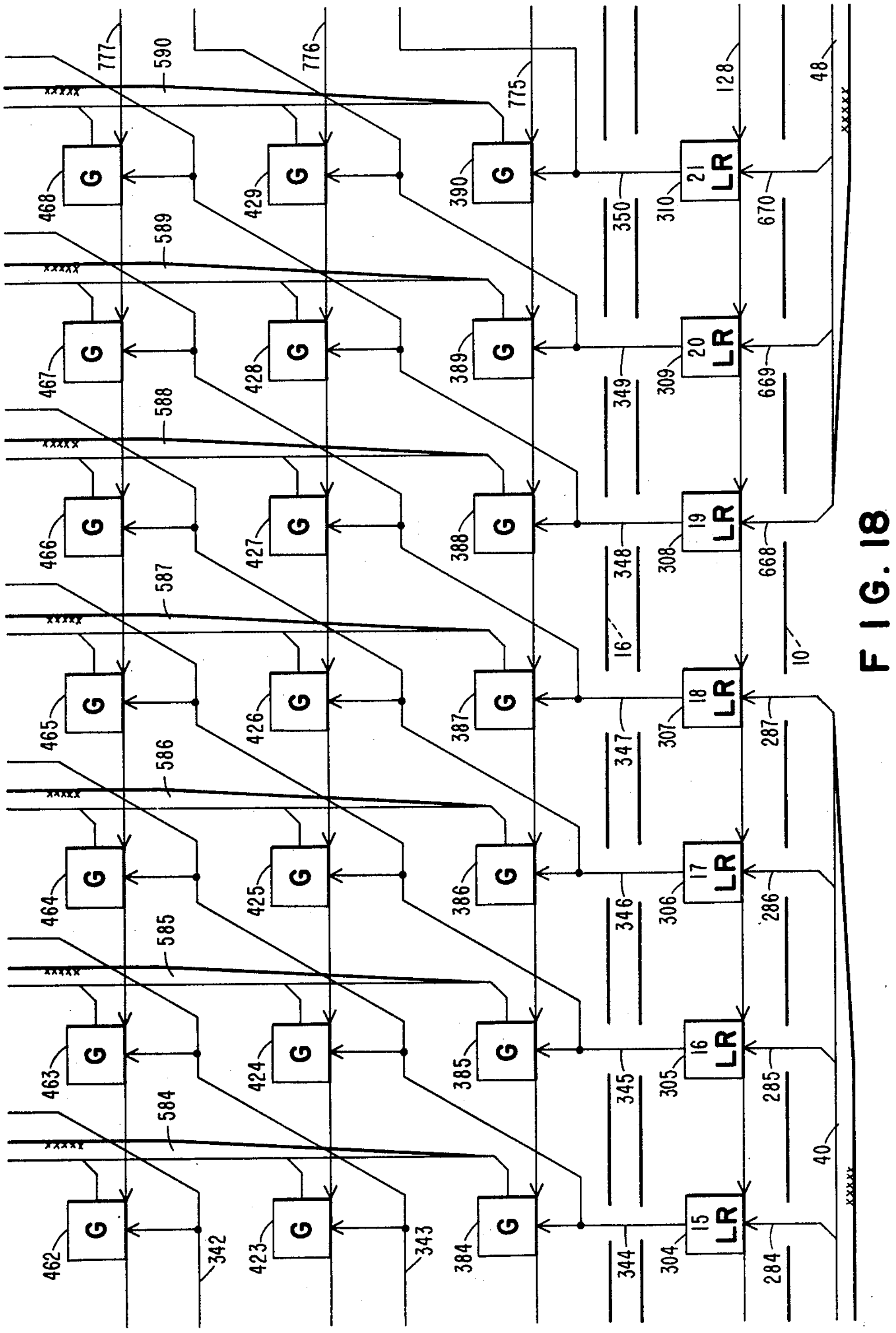
Figure 19:
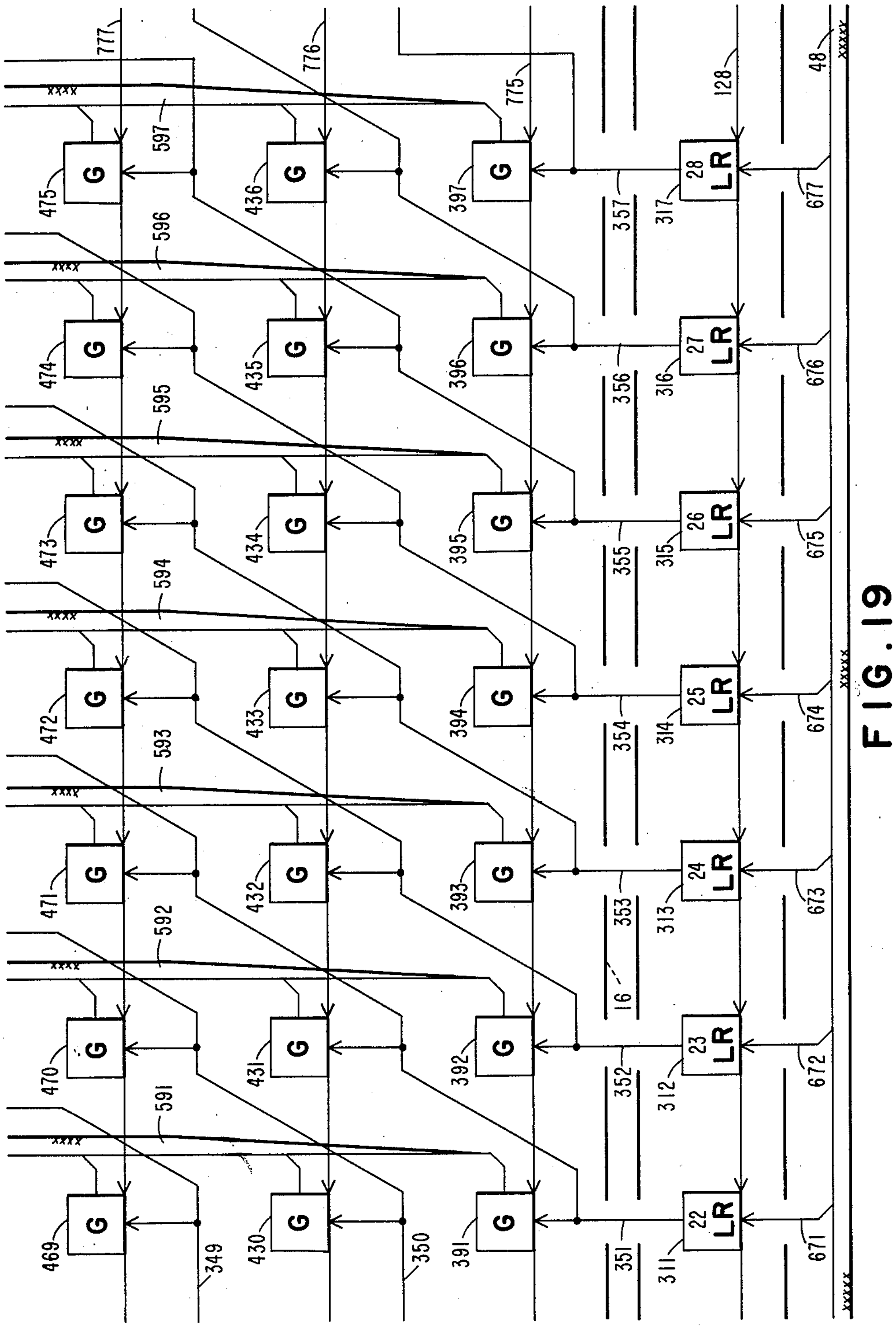

Upon the occurrence of the third latch control signal to the latch control line 122, the data in the latch registers 308 through 325 will be shifted three positions to the right. The outputs of the latch registers 308 through 322 in FIGS. 18 through 20 are applied through the respective lines 348 through 362, the respective shift three gates 508 through 522 in FIGS. 11 through 13, the respective OR circuits 631 through 645 and the cable 48 to the respective latch registers 311 through 325 in FIGS. 19 through 21.

Since a shift of three is made, the contents of the latch registers 323 through 325 in FIGS. 20 and 21 are shifted out of the accumulator and multiplier latch register. In a similar manner the outputs of the latch registers 305 through 307 in FIG. 18 are passed through the respective shift three gates 505 through 507 in FIG. 10, the respective OR circuits 628 through 630 and the cable 48 to the respective latch registers 308 through 310 in FIG. 18. Since the outputs of the OR circuits 610 through 627 in FIGS. 8 through 10 are connected to the respective adders 250 through 567 in FIGS. 5 through 7, the data appearing at the outputs of these OR circuits is not directly shifted back into the accumulator and multiplier latch register. These OR circuits 610 through 627 serve to apply the shifted outputs of the accumulator portion of the accumulator and multiplier latch register to the adders 250 through 267 before the addition is made. Then, when the outputs of the OR circuits 628 through 645 in FIGS. 10 through 13 are applied back to the multiplier portion of the accumulator and multiplier latch register, the outputs of the adders 250 through 267 are applied to the accumulator portion of the accumulator and multiplier latch register. In other words, the shifter shifts the outputs of the latch registers 290 through 307, depending upon the amount of shift requested, before these outputs are applied to the adders 250 through 267. Upon the occurrence of the third latch control signal, the data appearing at the inputs of the latch registers 290 through 325 in FIGS. 16 through 21 is stored within these latch registers.

During the second cycle the shift decoder 62 in FIGS. 14 and 22 operated in the manner described above to determine what the next shift would be, and this shaft request is stored in the shift control latch register in FIGS. 13 and 21 when the third latch control signal occurs. As shown in FIG. 2, this shift request is a shift of two, and upon the occurrence of the third latch control signal the data applied to the inputs of the latch registers 308 through 325 will be shifted two positions with respect to their outputs. Likewise, the data applied to the adders 250 through 267 in the third cycle is shifted two positions to the right. For example, in the third cycle, the outputs of the latch registers 290 through 307 are as shown in row 9, columns 1 through 18 in FIG. 2, and the outputs of the OR circuits 610 through 627 in FIGS. 8 through 10 are as shown in row 10, columns 1 through 18 of FIG. 2. Note that the data in row 10 is shifted two positions to the right with respect to the data shown in row 9. Hence, the outputs of the latch registers 290 through 305 are applied through the respective lines 330 through 345, the respective shift two gates 450 through 465 and the respective OR circuits 612 through 627 to the adders 252 through 267, respectively, in FIGS. 5 through 7. The output of the latch register 290 in FIG. 16 also is applied through the line 330, the shift two gates 448 and 449, and the respective OR circuits 610 and 611 in FIG. 8 to the adders 250 and 251 in FIG. 5. The arrangement of the lefthand portion of the shifter is such that the output of the latch register 290 in FIG. 16 is applied to the OR circuits 610 through 613 in FIG. 8 (depending upon the amount of shift made) when left end positions of the shifter would be made vacant by the shift. In other words, if a zero shift is made the output of the latch register 290 is applied through the zero shift gate 370 to the OR circuit 610 in FIG. 8. If a one shift is made, the output of the latch register 290 is applied through the gate 409 to the OR circuit 610. If a shift is made, the output of the latch register 290 is applied through the gates 448 and 449 to the OR circuits 610 and 611. If a three shift is made, the output of the latch register 290 is applied through the shift three gates 487 through 489 in FIG. 8 to the OR circuits 610 through 612, and if a shift four is made, the output of the latch register 290 is applied through the shift four gates 526 through 529 to the OR circuits 610 through 613. This circuit arrangement provides inputs to the high order adder positions which might be left vacant by the shift. These inputs are ones if the partial product is complement, and zeros if the partial product is true.

Although the shifter illustrated is capable of only shifts up to a maximum of four, shifts greater than four may occur. If a shift of four is made when a shift of more than four is required, both inputs to the exclusive OR circuit 56 will be negative, and this exclusive OR circuit will provide a negative output through the line 58 to decondition the gates 230 through 248 in FIGS. 5 through 7. This arrangement prevents an addition during that cycle and a shift of four is made followed by the normal operation during the next cycle. The shift decoder 62 in FIGS. 14 and 22 will provide an output indicating a shift of four, and in the next cycle the remaining shift will be taken in the normal manner. If a shift of five is indicated, the shift decoder 62 provides an output indicating a shift of four, and the AND circuit 716 in FIG. 22 provides a positive output which is stored in the latch register 728 to indicate a shift of one in the next cycle. Hence, when a shift five is indicated a shift of four is made in one cycle followed by a shift of one in the next cycle.

In the event that the shift indicated by decoding multiplier bits (the shift requested) is larger than the shift available, the carry from the adder 834 in FIG. 15 goes negative. This negative carry is applied by the line 104 to the inverter 822 in FIG. 14. The inverter 822 provides a positive output on the line 824 to condition the AND circuits 808, 810, 814 and 816. The negative signal also is supplied by the line 104 to decondition each of the AND circuits 716, 718A, 722A and 726A in FIG. 22. In this case, one of the AND circuits 808, 810, 814 and 816 in FIG. 14 will have all positive inputs and will provide a positive output, and none of the AND circuits 716, 718A, 722A and 726A will provide a positive output. If, for example, the shift remaining is two, the AND circuit 814 will provide a positive output through the OR circuit 748 in FIG. 22 and the gate 754 in FIG. 21 to the shift two latch register 762.

It should be noted that the shift decoder is connected with positions 31 through 35 (OR circuits 640 through 644) of the shifter output while the multiplier was entered into positions 19 through 34. The shift decoder is offset in this manner to provide spacing bits (between the multiplier and the product) to prevent decoding complications in the final decode operation. An offset of two is utilized, and this provides two zeros between the high order bit of the multiplier and the low order bit of the partial product. Without such an offset, the fact that the final operation results in zero in the shift counter latch register must be used to assure an addition instead of a subtraction for the last operation. It will be appreciated that by utilizing the offset as illustrated, the shift decoder is not confused by decoding a group of multiplier bits situated adjacent a group of product bits, which decoding may produce erroneous results or decoding complications.

The operation of the multiplier continues as described above and as shown in the table in FIGS. 2 and 3. When all zeros are stored in the shift counter latch registers 800 through 804, the OR circuit 850 in the zero detector in FIG. 15 supplies a negative signal which is inverted by the inverter 852 to provide a positive output on the line 112. This positive output on the line 112 is applied to a trigger (not shown) in equipment associated with the present multiplier to indicate that the present cycle is the last cycle. Operation of the multiplier will terminate upon the completion of the next latch control signal (the ninth latch control signal shown in the table in FIGS. 2 and 3). At this time the product is in the proper form and in the proper positions in the accumulator and multiplier latch register. The product is in latch registers 292 through 323 in FIGS. 16 through 20. This product may be read from these latch registers through a cable (not shown) to a storage device by applying a proper control signal to the storage device.

Although in the above arrangement for performing multiplication the operation starts at the low order end of the multiplier, the multiplication may be performed starting from the high order end of the mutliplier. In this latter case, the partial product always will be in true form, but any operation may result in a carry traveling the full length of the partial product. The shifting rules are somewhat different, and these are given below.

(1) When shifting across "zeros" (from the high order end of the multiplier)
  (a) If the first "one" following the "zeros" is followed immediately by a second "one," stop shifting at the last "zero" and add the multiplicand, then shift across the following "ones."
  (b) If the first "one" following the "zeros" is followed immediately by a "zero," stop shifting at the first "one" and add the multiplicand, then shift across the following "zeros."

(2) When shifting across "ones" (from high order end of multiplier)
  (a) If the first "zero" following the ones is followed immediately by a second "zero," stop shifting at the last "one" and subtract the multiplicand; then shift across the following "zeros."
  (b) If the first "zero" following the "ones" is followed immediately by a "one," stop shifting at the first "zero" and subtract the multiplicand, then shift across the following "ones."

The high-order bit of the multiplier is treated as though there were at least two higher order "zeros" immediately preceding it. This method of decoding the multiplier will yield the same number of add cycles as the method previously discussed. The number of add cycles is dependent on the number and distribution of ones within the multiplier. If random distribution is assumed, the average shift for each addition will be three bit positions when using a shifter of infinite length. Although a shifter capable of making shifts up to four is described and illustrated, a larger or a smaller shifter may be utilized if desired. An approximation of the bits shifted across per cycle relative to the shifter limit is indicated below.

| Shifter limit: | Bits shifted across per cycle |
|---|---|
| 3 | 2.32 |
| 4 | 2.65 |
| 5 | 2.82 |
| 6 | 2.90 |
| 7 | 2.95 |
| 8 | 2.97 |
| Infinite | 3.00 |

These figures do not take into account the fact that the multiplier has a finite length. If this were considered in computing the above figures, a slight reduction in the bits shifted across per cycle would be noted.

The AND circuits, the OR circuits, the exclusive OR circuits, the gates and the inverter circuits employed in the illustrative multipliers of the present invention may be any one of various suitable types, and a detailed consideration of them is not considered necessary since they are quite widely known.

Figure 23A:
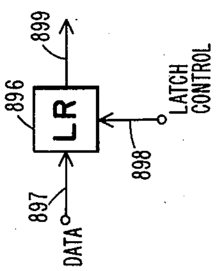
Figure 23B:
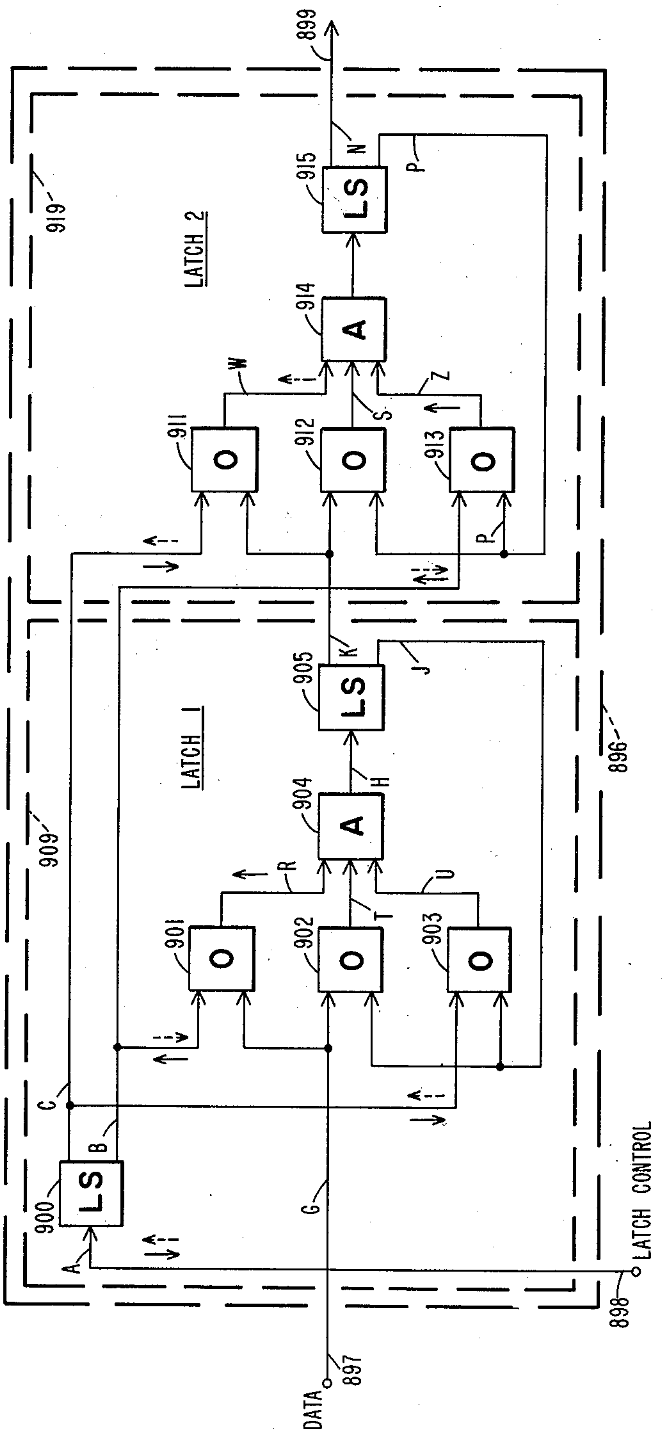

FIG. 23*a* shows the block symbol of a latch register which is shown in detailed logic block form in FIG. 23*b*. Latch registers such as the one shown in FIG. 23*b* are utilized throughout the various figures, such as, the accumulator and multiplier latch register shown in detail in FIGS. 16 through 21. A latch register is a device having two inputs which are a data signal input and a latch control input. The latch register accepts information at the time the latch control signal changes from a de-energized condition to an energized condition. The data signal input must maintain its desired condition for a small interval of time immediately preceding, during and following the application of the latch control signal, this interval of time being measured in terms of circuit transit times. At all other times, regardless of whether the latch control signal is energized or de-energized, the output from the latch register is not controlled by the state of the data input signal which signal may be changed at will.

The latch register shown in FIG. 23*b* includes circuits 900 through 905 which constitute a first latch 909, and circuits 911 through 915 which constitute a second latch 919. By "latch" is meant a circuit having a control input and a data input, the output of which follows the data input when the control input is de-energized. The output remains constant at the state it had when the control input changed so long as the control input is energized regardless of any changes in the data input during this time. A latch register differs from a flip-flop since a flip-flop is a bistable device which, when set to one state, retains that state until set to the other state.

The two latch circuits 909 and 919 in FIG. 23*b* are connected in series; that is, the output of the first latch circuit 909 is connected as the input to the second latch circuit 919. The data input signal is applied to the first latch 909 through a line 897, and the latch control signal is applied to the latch circuit 909 through an input line 898. The output from the second latch circuit 919 is taken through a line 899. The latch control signals are connected in opposition; that is, when the first latch circuit 909 is locked, the second latch circuit 919 is free, and when the second latch circuit 919 is locked, the first latch circuit 909 is free.

The AND circuits 904 and 914, and the OR circuits 901 through 903 and 911 through 913 are assumed to be constructed with diodes, and the level setters 900, 905 and 915 are constructed with transistors. The signal on the lower output of the level setters has the same polarity as the signal applied to the level setters, and the polarity of the signal on the upper output is opposite to the polarity of the input signal. For example, if the input line A to the level setter 900 in FIG. 23*b* is positive, the output line B is positive and the output line C is negative. For purposes of description, the transist time through one level setter is considered to represent one unit of time. The transit time through the AND and OR circuits is assumed to be zero. The logic is assumed to be positive.

Figure 24:
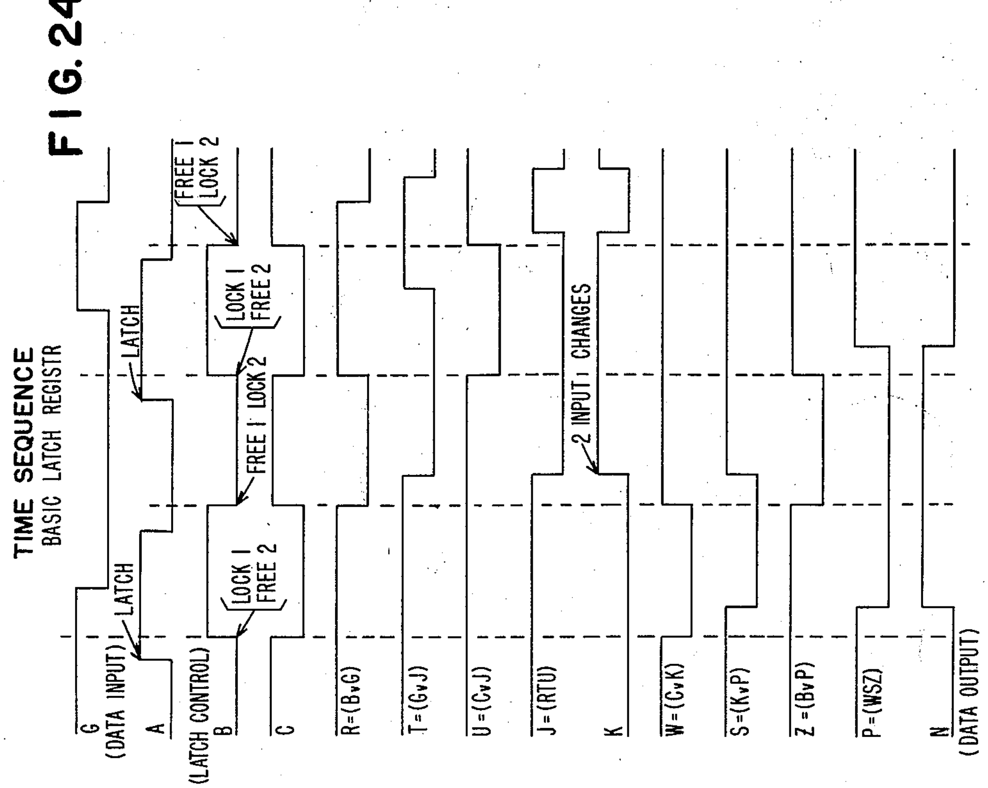
FIG. 24 is a timing diagram used in conjunction with the explanation of the latch register illustrated in FIG. 23*b*.

In order to illustrate the operation of the latch register 896 shown in FIG. 23*b*, various points of the circuit are designated by various letters of the alphabet, and the signals at these points change their potential in a manner indicated in FIG. 24. FIG. 24 is a timing sequence diagram illustrating how the waveforms change at various points in the circuit of FIG. 23*b*. When the latch control signal on the line 898 is negative, the first latch circuit 909 is free and the second latch circuit 919 is locked. The dashed arrows indicate circuit conditions when the latch control signal is negative. The point C is positive which causes the output of the OR circuit 903 to be positive, thereby making U positive. This leaves points R and T to determine the conditions of point H. Since B is negative (the opposite polarity of C), R is controlled only by G, and T is positive whenever G is positive. The potential of G is determined by the data input applied through the line 897. Therefore, the potential at point H will follow the potential at point G and the potential at J will follow the potential at H, through the changes at J will lag one unit of time behind the corresponding change at H.

When the control signal at A is positive, the first latch circuit 909 is locked and the second latch circuit 919 is free. The solid arrows indicate circuit conditions when the control signal is positive. In this case, the condition of the signals at points J and K will not change even through the signals at G do change. Since the signal at B is positive in this case, the signal at R will remain positive. The signal at T will be positive if the signal at J is positive, through the signal at T will not be negative necessarily if G is negative. Since the signal at C is negative, the signal at U is controlled only by the condition of the signal at J. Therefore, if the signal at J is positive, it will be held positive by the feedback through the points U and T. If the signal at J is negative, there is no path by which the signal at G can bring the signal level at U positive.

In order to set a signal into the latch register, the data signal at G (input line 897) must be held at its desired condition sufficiently long in advance of changing the signal at B and C for the signal at J to acquire the same condition as the signal at G, and the signal at G must maintain this condition until the switching of the signals at B and C is complete. The second latch circuit 919 operates in the same manner as the first latch circuit 909 except that the input to the former uses the signal level at K instead of the signal level at G, and the connections of the input lines of the level setter 900 are reversed with respect to the OR circuits 911 through 913, i.e., the signals at B and C are inverted in the second latch circuit 919 when compared with the first latch circuit 909.

The sequence time chart in FIG. 24 illustrates that although the latch control signal locks the second latch circuit 919 at the same time that it frees the first latch circuit 909, the change in the output of the first latch circuit 909 does not occur until one unit of time later. This operation allows sufficient time for the locking action of the second latch circuit 919 to be completed. An overlap must be maintained here to assure reliable operation.

The use of the signal level at K as an input to the second latch circuit 919 was selected to make the signal level at N, which has no other load on it, agree with the signal level at G. This also reduces the effects of skew between signals on lines B and C on the operation of the circuit. However, if desired, the signal level at J may be used as the input to the second latch circuit 919 as well as for feedback. If this were done, the signal level at P would be set to agree with the signal level at G.

Figure 25:
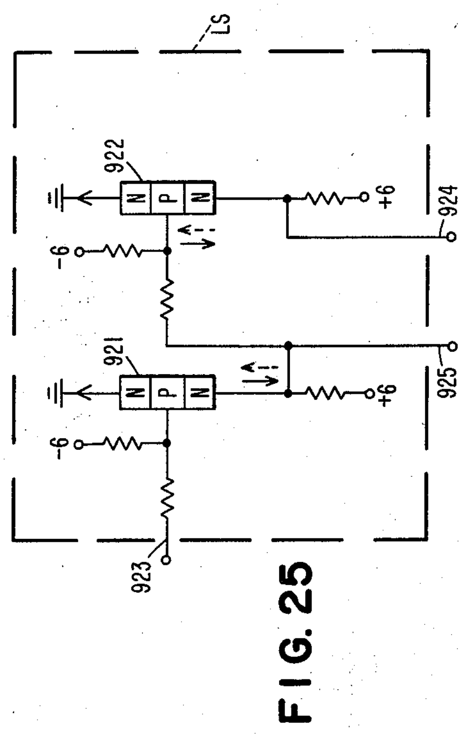
FIG. 25 is a circuit diagram of a level setter employed in the latch register in FIG. 23*b*.

The level setters 900, 905 and 915 illustrated in block form in FIG. 23*b* may be any one of various suitable types, and one suitable arrangement is illustrated in detail in FIG. 25. The level setter in FIG. 25 includes interconnected transistors 921 and 922. When a signal of one polarity is applied to input line 923, a signal of the same polarity appears on an output line 924. The output line 925 has a signal of a polarity which is opposite to the polarity of the signal on the output line 924.

In operation, a positive signal applied to the input line 923 causes the transistor 921 to be conductive and the transistor 922 to be non-conductive. Accordingly, the potential on the output line 924 approaches a value toward positive six volts. When a signal level of approximately zero volts is applied to the input line 923, the transistor 921 is rendered non-conductive and the transistor 922 becomes conductive. Consequently, the potential on the output line 924 approaches ground for the zero level. A zero level is more negative than the positive six volt level, and the zero level accordingly is referred to as a down or negative level.

The level setter in FIG. 25 serves to accept signal levels on the input line 923 which signals vary within limits around plus six volts or zero volts, and provides output signals on the output line 924 which are fixed in amplitude within certain precise limits. When the signal on the output line 924 is six volts positive, a signal on the output line 925 is approximately zero volts. When the signal on the output line 924 is approximately zero volts, the signal on the output line 925 is approximately six volts positive.

Figure 26:
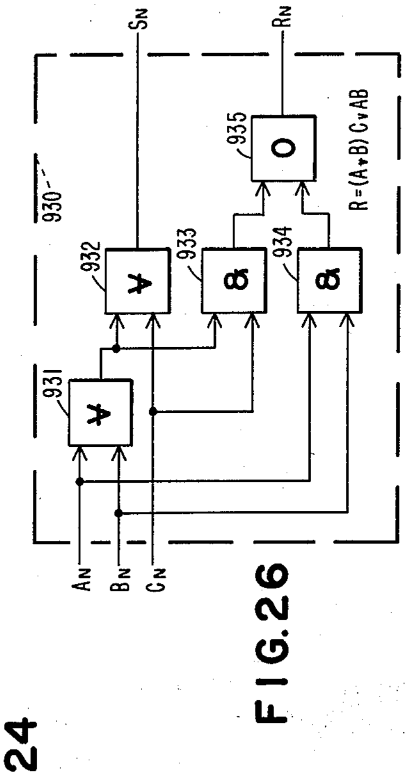
FIG. 26 is a logic diagram of an individual adder utilized in FIGS. 5 through 7 and 15.

The adder circuit employed within the adders of the present invention may be any one of many suitable types. One suitable adder circuit is illustrated in FIG. 26. This adder circuit includes exclusive OR circuits 931 and 932, AND circuits 933 and 934, and an OR circuit 935 connected as shown. Three binary inputs to the adder in FIG. 26 are labeled $A_n$, $B_n$ and $C_n$. The outputs, which represent a sum and a carry from the addition of the quantity $A_n$, $B_n$ and $C_n$, are designated $S_n$ and $R_n$. A positive signal on the input lines represents a binary one and a negative signal represents a binary zero. A positive signal on the output line $S_n$ represents a sum of one, and a positive signal on the output line $R_n$ represents a carry of one.

Whenever the $A_n$ and the $B_n$ inputs are unlike, the exclusive OR circuit 931 supplies a positive signal to the exclusive OR circuit 932. Whenever the signal supplied by the exclusive OR circuit 931 to the exclusive OR circuit 932 if unlike $C_n$, a positive signal is supplied on the output line $S_n$ and this positive signal represents a binary sum of one. For all other conditions the output signal on the line $S_n$ is a negative signal representing a binary sum of zero.

The exclusive OR circuit 931 supplies a signal to the AND circuit 933, and the input line $C_n$ supplies a signal to the AND circuit 933. Whenever both of these lines are positive, the AND circuit 933 provides a positive signal through the OR circuit 935 to the output line $R_n$. A positive signal on the line $R_n$ represents a carry of one. The lines $A_n$ and $B_n$ are connected to the AND circuit 934 which in turn is connected through the OR circuit 935 to the output line $R_n$. Whenever both the $A_n$ and the $B_n$ inputs are positive, the output line $R_n$ is rendered positive thereby indicating a carry of one. When neither the AND circuit 933 nor the AND circuit 934 provide a positive signal to the OR circuit 935, a negative signal appears on the output line $R_n$ representing a carry of zero. Accordingly, the adder circuit 930 in FIG. 26 responds to signals on the input lines $A_n$, $B_n$ and $C_n$ and provides signals on the output lines $S_n$ and $R_n$ representative of a sum and a carry, respectively.

It now should be apparent that the present invention provides a multiplication device which utilizes variable length shifts across bits in the multiplier to provide faster operation. In performing multiplication, additions are made for groups of bits instead of for each individual bit. The length of shift made for each add cycle depends on the bit distribution in the multiplier, and a number of bits may be shifted across in each cycle. Since an addition is not made for each bit, the speed of operation of the present arithmetical device is increased.

While the invention has been particularly shown and described with reference to a preferred embodiment thereof it will be understood by those skilled in the art that various changes in form and details may be made therein without departing from the spirit and scope of the invention.

What is claimed is:

1. A binary multiplier device for skipping a string of zeros or a string of ones in a multiplier proceeding from the highest to the lowest orders, said binary multiplier including first register means for storing signals representative of a multiplicand, second register means for storing signals representative of a multiplier, third register means for storing signals representative of a partial product, a shifter connected to the second and third register means for shifting signals stored in the second and third register means a variable number of positions, an adder, said third register means being connected to the adder for conveying signals representative of a partial product to said adder, said first register means being connected to said adder for supplying means representative of a multiplicand to said adder, said adder having an output connected to said third register means, said third register means storing output signals from said adder which output signals represent a partial product, control means coupled to said first register means, said second register means, said third register means, said shifter and said adder, said control means including first, second and third means, said first means sensing a plurality of orders of the multiplier in said second register means progressing from the highest to the lowest orders and operating said shifter to shift the content of said second register means and said third register means a plurality of positions depending on the number of zeros or the number of ones in a string in the multiplier, said second means adding the multiplicand to the partial product or subtracting the multiplicand from the partial product depending on the distribution of binary ones and zeros following the multiplier positions skipped, said third means keeping track of the number of multiplier shifts made and terminating the multiply operation after a given number of multiplier shifts, said control means including further circuits for operating said shifter; (1) to shift across high order multiplier bits in the second register means which are zeros, to stop shifting at the last zero, and to add the multiplicand in the first register means to the partial product in the third register means and shift across the following ones if the first one following the zeros is followed immediately by a second one, or to stop shifting at the first one and to add the multiplicand in the first register means to the partial product in the third register means and shift across the following zeros if the first one following the zeros is followed immediately by another zero; (2) to shift across high order multiplier bits in the second register means which are ones, to stop shifting at the last one, and to subtract the multiplicand in the first register means from the partial product in the third register means and shift across the following zeros if the first zero following said ones is followed immediately by a second zero, or to stop shifting at the first zero, and to subtract the multiplicand and shift across the following ones if the first zero following said ones is followed immediately by a second one.

2. The apparatus of claim 1 wherein said second register means has two positions more on the high order end than required to store the multiplier and zeros are stored in said two positions.

3. The apparatus of claim 1 wherein the third means includes further means for storing signals representing the number of shifts required to generate a product and an adder for subtracting the number of shifts made from the number of shifts available.

References Cited by the Examiner

UNITED STATES PATENTS

| | | | |
|---|---|---|---|
| 2,404,047 | 7/46 | Flory et al. | 235—164 |
| 2,672,283 | 3/54 | Havens | 235—164 |
| 2,777,634 | 1/57 | Williams et al. | 235—157 |
| 2,777,635 | 1/57 | Tootill et al. | 235—157 |
| 2,786,628 | 3/57 | Kilburn | 235—157 |
| 2,927,732 | 3/60 | Rinder et al. | 235—157 |
| 3,018,958 | 1/62 | Walker et al. | 235—164 |
| 3,120,606 | 2/64 | Eckert et al. | 235—164 |

MALCOLM A. MORRISON, *Primary Examiner.*

WALTER W. BURNS, Jr., *Examiner.*